US008922925B1

(12) United States Patent
Coker et al.

(10) Patent No.: US 8,922,925 B1
(45) Date of Patent: Dec. 30, 2014

(54) ACTIVELY WRITTEN GUARD BANDS IN A COLD STORAGE OR MIXED MODE DRIVE

(71) Applicant: HGST Netherlands B.V., Amsterdam (NL)

(72) Inventors: Jonathan Darrel Coker, Rochester, MN (US); David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/100,566

(22) Filed: Dec. 9, 2013

(51) Int. Cl.
*G11B 20/12* (2006.01)

(52) U.S. Cl.
USPC .......................................................... 360/48

(58) Field of Classification Search
None
See application file for complete search history.

(56) References Cited

U.S. PATENT DOCUMENTS

| | | | |
|---|---|---|---|
| 6,084,732 A | 7/2000 | Lee | |
| 6,185,063 B1 * | 2/2001 | Cameron | 360/78.04 |
| 6,256,160 B1 | 7/2001 | Liikanen et al. | |
| 7,076,603 B1 | 7/2006 | Chheda | |
| 7,337,263 B2 | 2/2008 | Cho et al. | |
| 7,408,731 B2 * | 8/2008 | Uemura et al. | 360/48 |
| 7,486,460 B2 * | 2/2009 | Tsuchinaga et al. | 360/48 |
| 7,929,233 B2 | 4/2011 | Bergevin | |
| 8,102,613 B2 | 1/2012 | Duan et al. | |
| 8,315,006 B1 | 11/2012 | Chahwan et al. | |
| 8,411,384 B2 | 4/2013 | Mochizuki et al. | |
| 8,559,121 B2 * | 10/2013 | Saito et al. | 360/13 |
| 8,578,122 B2 | 11/2013 | Coker et al. | |
| 8,593,748 B1 * | 11/2013 | Bandic et al. | 360/31 |
| 8,638,514 B2 * | 1/2014 | Sato et al. | 360/48 |
| 8,699,185 B1 * | 4/2014 | Teh et al. | 360/135 |
| 8,724,248 B2 | 5/2014 | Dhanda et al. | |
| 2002/0036849 A1 | 3/2002 | Quak et al. | |
| 2002/0071198 A1 | 6/2002 | Liu et al. | |
| 2006/0227449 A1 | 10/2006 | Che et al. | |
| 2009/0327598 A1 | 12/2009 | Tamura et al. | |
| 2012/0176698 A1 | 7/2012 | Rub | |
| 2012/0210092 A1 | 8/2012 | Feldman | |
| 2012/0281304 A1 | 11/2012 | Jin et al. | |
| 2012/0300328 A1 | 11/2012 | Coker et al. | |
| 2012/0303930 A1 | 11/2012 | Coker et al. | |
| 2013/0135764 A1 | 5/2013 | Dhanda et al. | |
| 2013/0170061 A1 | 7/2013 | Saito et al. | |

* cited by examiner

*Primary Examiner* — K. Wong
(74) *Attorney, Agent, or Firm* — Billion & Armitage; Richard E. Billion

(57) ABSTRACT

A disk drive having at least one disk with a major disk surface that includes a first region including a plurality of tracks and a second region including a plurality of tracks. The first and second region are separated by a guard band. The track or tracks near the guard band have a track width that is greater than the track widths of the tracks more distant from the guard band, such as those in the middle of the first and second regions as this reduces the occurrence of far track interference.

20 Claims, 15 Drawing Sheets

ACTIVELY WRITTEN GUARD BANDS IN A COLD STORAGE OR MIXED MODE DRIVE

TECHNICAL FIELD

Various embodiments described herein relate to a method and apparatus for actively writing guard bands in a cold storage or mixed mode disk drive.

BACKGROUND

A disk drive is an information storage device. The most basic parts of a disk drive are an information storage disk that is rotated, an actuator that moves a slider carrying one or more transducers to various locations over the disk, and electrical circuitry that is used to write and read data to and from the disk. The one or more information storage disks are clamped to a rotating spindle. More specifically, storing data includes writing information representing the data to portions of tracks on a disk. The transducer includes two separate devices—a write transducer that writes information representing data to the disk and a read transducer or sensor that reads information from the disk.

Storing data includes writing information representing the data to the disk. Conventional disk drives with magnetic media organize data in concentric tracks. There is a constant goal in these storage devices to store increased amounts of data. Two ways of increasing the storage capacity of these storage devices include increasing the bit density, which means reducing the spacing between individual bits along the circumference of a concentric track or a substantially concentric track. The tracks can also be written as spirals in some applications. The bit density can be increased along the spiral path.

Another way to increase the capacity is to increase the track density. This involves writing the tracks more closely together. In some embodiments, a portion of a previously written track can be overwritten to produce tracks that are thinner or less wide. A portion of the original track is removed leaving a track thinner than the write width of a write element. The concept is referred as shingled writing. Shingled writing is generally a form of perpendicular magnetic recording that increases the areal density of magnetic recording. In shingle-written magnetic recording (SMR) media, a region (band) of adjacent tracks are written so as to overlap one or more previously written tracks. Unlike conventional tracks, which can be written in any order, the shingled tracks must be written in sequence. The tracks on an SMR disk surface are organized into a plurality of shingled regions (typically called I-regions) which can be written sequentially from an inner diameter (ID) to an outer diameter (OD) or from OD to ID.

As the density of the bits and tracks increase, magnetic information from one bit or collection of bits on a track may interfere or be combined with magnetic information from surrounding tracks. This includes interaction between a written track and prior and subsequent tracks. The interactions can be on adjacent tracks resulting in adjacent track interference (ATI), but are not limited to adjacent tracks. In some instances, the interaction can be several tracks away. These interactions are referred to as far track interference (FTI). FTI in some instances is the partial erasure of a track or tracks that are more than one track away from the track being currently written. Any inter-track interference results in diminished accuracy of read back data.

SUMMARY OF THE INVENTION

A disk drive has at least one disk with a major disk surface that includes a first region including tracks having a first track width and a second track width. The second track width is wider than the first track width. The disk drive also has a second region including tracks having a third track width and a fourth track width. The third track width is wider than the fourth track width A guard band is positioned between the first region and the second region. The second track and the third track are positioned adjacent the guard band. The first region includes a plurality of tracks between the first track and the second track. The second region also includes a plurality of tracks between the third track and the fourth track. The tracks of the first region positioned near the second track having track widths that are wider than the tracks positioned near the first track, and the tracks of the second region positioned near the third track have track widths that are wider than the tracks positioned near the fourth track. In other words, the tracks near the guard band are wider than the tracks more distant from the guard band. This is done in order to minimize far track interference that occurs when narrow tracks are written near the guard band. The far track interference is more likely to occur when a region is defragged often, which results in a narrow track near the guard band being written and rewritten multiple times.

A method for decreasing far track interference on a disk drive includes designating a plurality of regions on a disk where information is to be stored, separating at least two of the plurality of regions on the disk drive by a guard band. The method includes writing information representing data to at least one of the plurality of regions. The tracks adjacent at least one of the guard bands of the region have a width greater than a track in the middle of the region.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

In general, this disclosure describes techniques for writing data to a storage medium. In particular, this disclosure describes a disk with different regions. In the different regions, different recording technologies are used. The disk drive also can include a write buffer area called an E-region. Techniques described in this disclosure are used to write data to the disk in the various regions using several different write technologies. In addition, the regions can be written at various capacities based on a determination of a favorable operating environment. This produces a disk drive having a variable capacity. The data capacity of one or more regions of the disk or disks can be increased using one or more of writing techniques described or by changing the parameters of the writing techniques. The writing techniques are changed on the fly or in the field after performance indicators are used to determine if the capacity can be increased.

Figure 1:
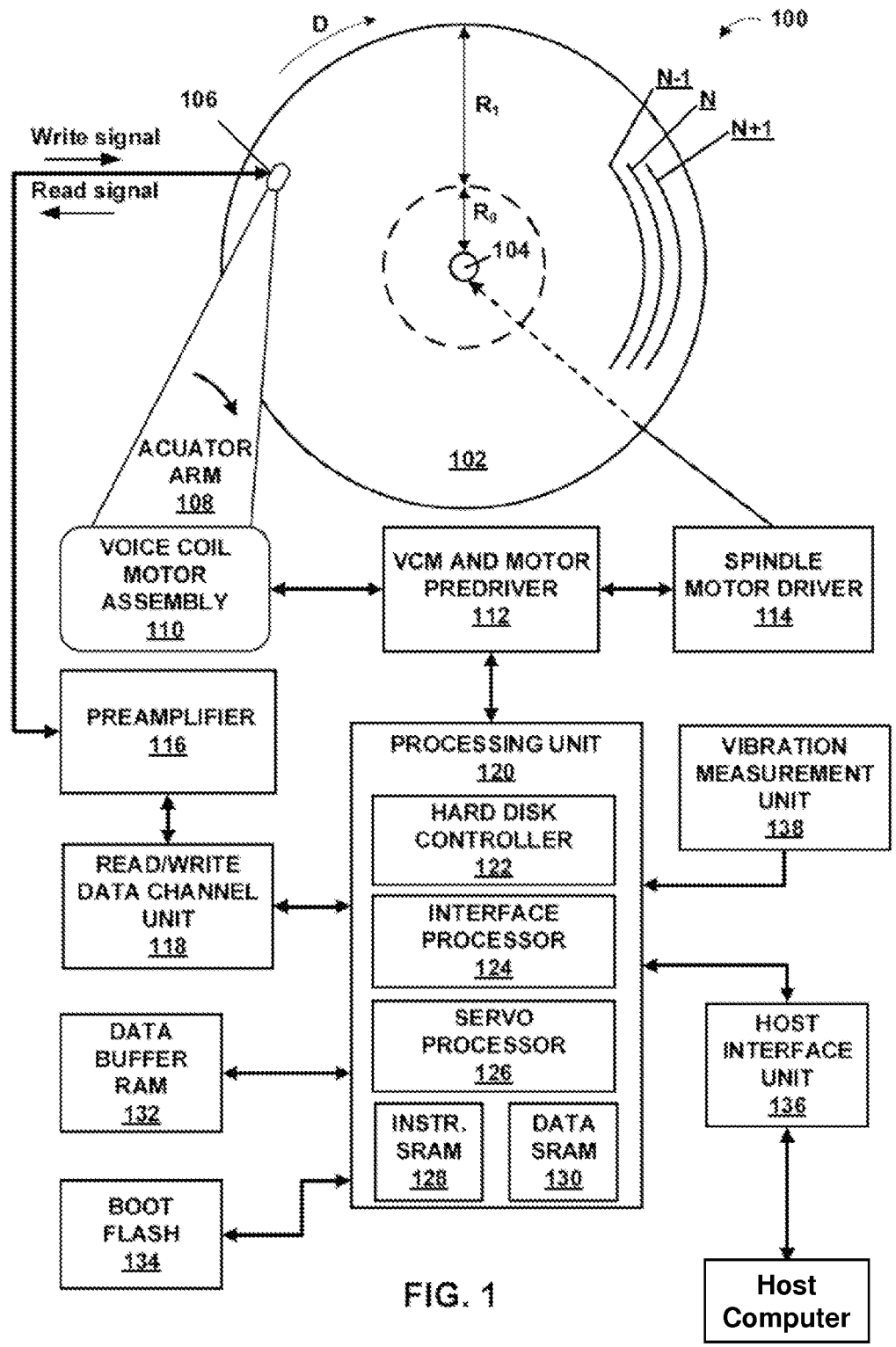
FIG. 1 is a schematic top view of a disk drive, according to an embodiment of the invention.

FIG. 1 is a schematic diagram illustrating an example hard disk drive that utilizes the techniques described in this disclosure. Hard disk drive 100, in this example, is operably coupled to a host device as an internal or an external data storage device. The disk drive 100 can be in a stand alone PC or can be part of a bank of disk drives used to store data, such as in a data warehouse. A host device may include, for example, a laptop or desktop computer or a similar device. The host device can also be a server. Hard disk drive 100, includes data recording disk or medium 102, spindle assembly 104, slider 106, actuator arm 108, voice coil motor assembly 110, a voice coil motor ("VCM") and motor predriver 112, spindle motor driver 114, preamplifier 116, read/write data channel 118, processing unit 120, data buffer RAM 132, boot flash 134, host interface unit 136, and vibration measurement unit 138. Further, processing unit 120 includes hard disk controller 122, interface processor 124, servo processor 126, instruction SRAM 128, and data SRAM 130. It should be noted that although example hard disk drive 100 is illustrated as having distinct functional blocks, such an illustration is for descriptive purposes and does not limit hard disk drive 100 to a particular hardware architecture. In a similar manner, processing unit 120 should not be limited to a particular hardware architecture based on the example illustrated in FIG. 1. Functions of hard disk drive 100 may be realized using any combination of hardware, firmware and/or software implementations.

Disk 102 is coupled to spindle assembly 104 and rotates in direction D about a fixed axis of rotation. Disk 102 may be rotated at a constant or varying rate. Typical rates of rotation range from less than 3,600 to more than 15,000 revolutions per minute. However, disk 102 may be rotated at higher or lower rates and the rate of rotation may be determined based on a magnetic recording technique. Spindle assembly 104 includes a spindle and a motor and is coupled to spindle motor driver 114. Spindle motor driver 114 provides an electrical signal to spindle assembly 104 and the rate at which the spindle rotates, and thereby disk 102, may be proportional to the voltage or current of the electrical signal. Spindle motor driver 114 is coupled to a spindle motor and motor predriver 112. The spindle motor is typically housed within the spindle assembly 104. The spindle motor and motor predriver 112 are configured to use feedback techniques to insure disk 102 rotates as a desired rate. For example, spindle motor and motor predriver 112 may be configured to receive current and/or voltage signals from the motor for example and adjust the electrical signal provided to spindle motor driver 114 using feedback circuits. The feedback circuits compare a desired rotational position to the actual radial position. In some embodiments, servo wedges associated with embedded servo are used to provide radial position information.

As illustrated in FIG. 1, VCM and motor predriver 112 is also coupled to voice coil motor assembly 110. In addition to providing an electrical signal to spindle motor driver 114, VCM and motor predriver 112 is also configured to provide an electrical signal to voice coil motor assembly 110. Voice coil motor assembly 110 is operably coupled to actuator arm 108 such that actuator arm 108 pivots based on the current or voltage of the electrical received from signal VCM and motor predriver 112. As illustrated in FIG. 1, slider 106 is coupled to actuator arm 108. Thus, VCM and motor predriver 112 adjusts the position of slider 106 with respect to disk 102. VCM and motor predriver 112 may use feedback techniques to ensure slider 106 maintains a desired position with respect to disk 102. In one example, VCM and motor predriver 112 includes an analog-to-digital converter to monitor electromagnetic fields and current from voice coil motor assembly 110.

Slider 106 is configured to read and write data to disk 102 according to a magnetic recording technique, for example, any of the example magnetic recording techniques described herein. Slider 106 includes read head and write head corresponding to each of a plurality of disks included as part of disk 102. Further, slider 106 may include one or more read and write heads for each disk. For example, each disk in a stack of disks includes two major surfaces to which data can be stored. In one embodiment, there is a slider 106 positioned in transducing relationship with one major surface and another slider 106 positioned in transducing relationship with the other major surface of each disk in the disk stack. Slider 106 is coupled to preamplifier 116. Preamplifier 116 may also be referred to as arm electronics (AE). Preamplifier 116 is configured to select a correct head from a plurality of heads for a particular read or write operation. Preamplifier 116 is configured to drive head 106 with a write current, during a write operation. Further, preamplifier 116 is configured to amplify read signals from slider 106, during a read operation using a programmable head bias current. Preamplifier 116 may also be configured to detect errors during each of the read and write operations. Preamplifier 116 may include a signal adaptive filter (SAF) for thermal asperity (TA) recovery during a read operation.

Preamplifier 116 receives data to be written to disk 102 from read/write data channel unit 118. Further, preamplifier 116 provides data read from disk 102 to read/write data channel unit 118. Data may originate from a host device and may be communicated to read/write data channel unit 118 via host interface unit 136 and processing unit 120. Host interface unit 136 provides a connection between hard disk drive 100 and a host device. Host interface unit 136 may operate according to a physical and logical characteristics defined according to a computer bus interface. Example standardized interfaces include ATA (IDE, EIDE, ATAPI, UltraDMA, SATA), SCSI (Parallel SCSI, SAS), Fibre Channel, and PCIe (with SOP or NVMe).

As illustrated in FIG. 1, processing unit 120 includes hard disk controller 122, interface processor 124, servo processor 126, instruction SRAM 128, and data SRAM 130. Instruction SRAM 128 may store a set of operation instructions for processing unit 120. In one embodiment, instructions are loaded to instruction SRAM 128 from boot flash 134 when hard disk drive 100 is powered on. Data SRAM 130 and data buffer RAM 132, which is coupled to processing unit 120 are configured to buffer blocks of data during read and write operations. For example, blocks of data received from host interface unit 136 may be sequentially stored to data SRAM 130 and data buffer RAM 132 before the data blocks are written to disk 102. It should be noted that although instruction SRAM 128, data SRAM 130, data buffer RAM 132, and boot flash 134 are illustrated as distinct memory units, the functions of instruction SRAM 128, data SRAM 130, data buffer RAM 132, and boot flash 134 may be implemented according to other types of memory architectures.

Hard disk controller 122 generally represents the portion of processing unit 120 configured to manage the transfer of blocks of data to and from host interface unit 136 and read/write data channel unit 118. Hard disk controller 122 can be configured to perform operations to manage data buffering and to interface with host interface unit 136, according to a defined computer bus protocol, as described above. For example, hard disk controller 122 can receive and parse packets of data from host interface unit 136. Further, hard disk controller 122 is configured to communicate with a host, such as a host computer or the like. For example, hard disk controller 122 may be configured to report errors to host and format disk 102 based on commands received from host. In other embodiments, the host merely sends write commands and read commands to the disk drive via the host interface unit 136 and the hard disk controller 122 handles formatting the disk and completing the read and write commands. The host interface unit 136 can include a read and write channel for encoding and decoding information representing data, performing error corrections on the data, and the like.

Disk 102 includes a stack of one or more disks having magnetic material deposited on one or both sides thereof. Disk 102 may be composed of a light aluminum alloy, ceramic/glass, or other suitable substrate that magnetic material may be deposited thereon. Using electromagnetic techniques, data may be stored on disk 102 by orientating an area of the magnetic material. Data stored on disk 102 may be organized as data blocks. Data blocks are typically 512 bytes or 4 K bytes in size, but may be other sizes as well. The magnetic areas of disk 102 may be arranged into a set of radially-spaced concentric tracks, illustrated in FIGS. 1 as N−1, N, and N+1. A particular data block may be located within a portion of a particular track.

Magnetic material of disk 102 is configured according to one of a plurality of magnetic recording techniques. Examples of magnetic recording techniques include longitudinal magnetic recording (LMR) and perpendicular magnetic recording (PMR). Additional magnetic recording techniques include shingled magnetic recording (SMR) and heat assisted magnetic recording (HAMR). SMR is a type of PMR that increases bit density compared to PMR by allowing previously written tracks to be partially overwritten. In other words, the write head overlaps a previously written track and erases a portion of the previously written track. The result is a thinner track and a disk drive having a higher track pitch or increased track density. The previous tracks are partially overlapped, similar to shingles on a roof and hence the name shingled magnetic recording. HAMR may be used in conjunction with LMR, PMR, or SMR techniques to achieve higher areal storage density.

The bit density, distance between tracks (referred to as track pitch), and track density of disk 102 may vary according to a magnetic recording technique. Track density may be defined according to the number of tracks per radial length (e.g., track per inch (TPI)). Track pitch may be defined as a target or nominal distance between tracks. Further, as illustrated in FIG. 1, disk 102 is configured to include plurality of regions, i.e., $R_0$, and $R_1$. Data may be recorded to each of $R_0$ and $R_1$ using different track densities and track pitches. Data can also be recorded using different writing techniques. In addition, certain types of data can also be compressed. For example, video data can be compressed as, upon being read, smoothing techniques can be used in the event of errors occurring in the information as read from the disk or magnetic layer of the disk.

Figure 2:
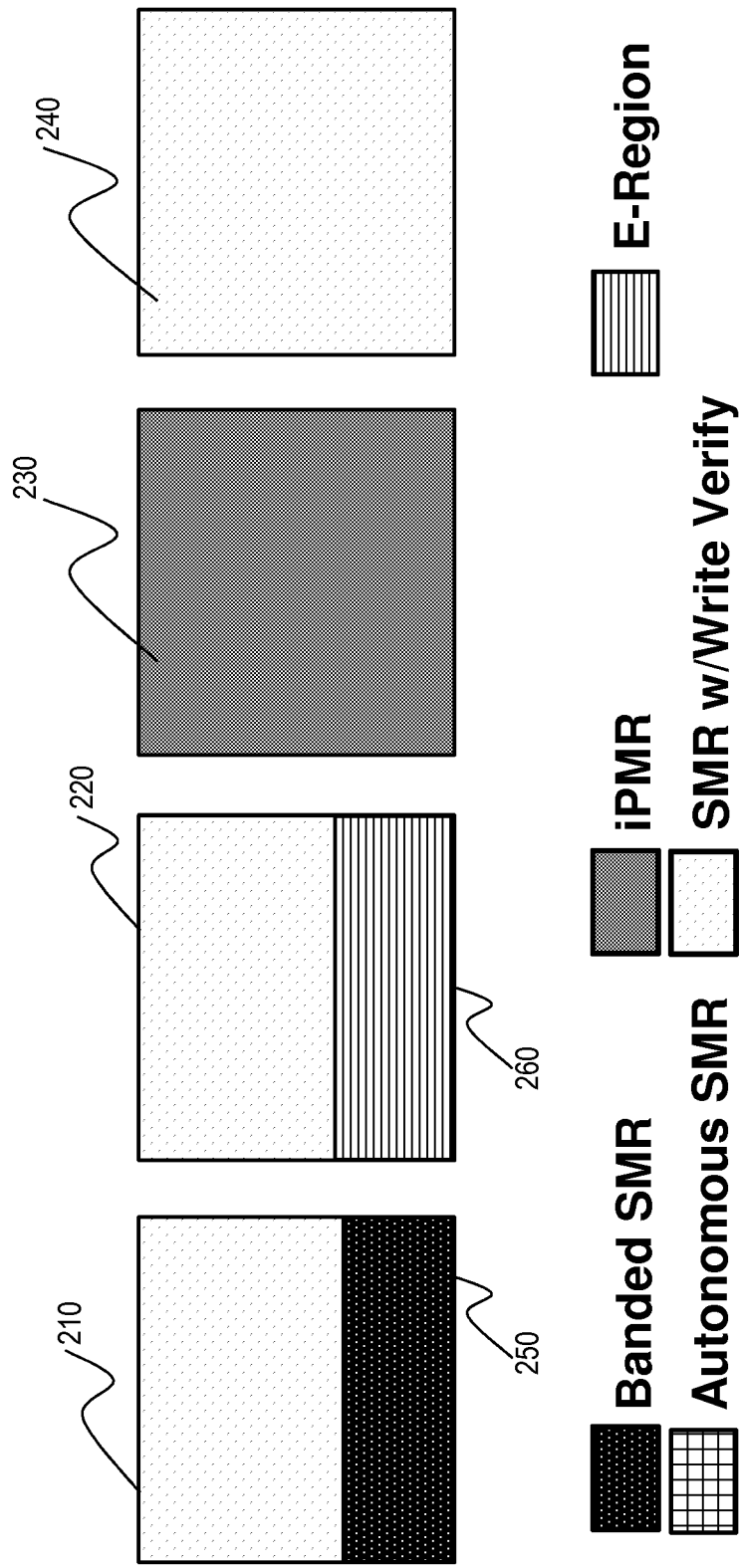
FIG. 2 is a schematic diagram illustrating an example of a plurality of regions on the surface or surfaces of one or more disks in a disk drive, according to an example embodiment.

FIG. 2 is a schematic diagram illustrating an example of a plurality of regions on the surface or surfaces 200 of one or more disks 102 in a disk drive, according to an example embodiment. As shown in FIG. 2, the disk surface or surfaces 200 include a number of regions 210, 220, 230, 240, 250 and 260. As described above, a region may include a plurality of sectors which are contained in a plurality of tracks associated with the region. The region can be defined according to a number of radially adjacent tracks, or as a range of radially adjacent tracks that are at a range of radial distances from the center of the disk. The region can also be defined as a number of physical block addresses or even as a number of logical block addresses, which will be discussed in more detail below.

The regions 210, 220, 230, 240, 250 and 260 include a plurality of I-regions 210, 220, 230, 240 and 250 where data is written. As shown, I-regions 210, 220, and 240 are written as shingled magnetic recording with write verify (SMR w/Write Verify). Some of these may be written from an innermost radius to an outermost radius of the region, while others may be written from the outermost radius to the innermost radius of the region. I-region 230 is written as iPMR which is an I-region written using indirected perpendicular magnetic recording. This is not shingled or does not have tracks which overlay one another. The track width of the iPMR I-region 230 will be wider than the SMR regions. The data is indirected which means that the host gives write commands using logical block addresses and the drive converts those to a physical block addresses. This is described in further detail below. The track widths will be closer to the write width of the write element of the transducer. I-region 250 is banded SMR. This is shingled magnetic recording. Bands are written near or at the innermost radius and at or near the outermost radius of the I-region 250. Although not shown in FIG. 2, an I-region can be written as autonomous SMR. Autonomous SMR is the host is oblivious to the SMR write constraints. The Host can send whatever read/write commands it wants to the drive. The drive handles all the defrag operations.

The regions can also include an E-region 260 where data is written temporarily until being rewritten to an I-region. In one example embodiment, the E-region is an on disk cache. The E-region 260 is also referred to as an "exception region" or a write buffer area or E-cache. An E-region 260 is used as a staging area for data or information representative of data which will ultimately be written to an I-region. An E-region may be configured to have either shingled or unshingled tracks. It should be noted that in some examples, hard disk drive 100 may include a so-called hybrid E-region where a hybrid E-region includes areas of disk 102 and portion data SRAM 130 which may be used by hard disk drive 100 for data staging. In another embodiment, the hybrid E-region can also include NAND memory. Generally, only a minor portion of a disk's area (e.g., 1%-10%) is an E-region 260. It should be noted that the I-regions 210, 220, 230, 240 and 250 can be associated with one disk surface or can be associated with several disk surfaces on several disks. In addition, an E-region 260 can be associated with one disk surface or with several. In one embodiment, there may be one E-region per major surface of the disk drive 100. In still other embodiments, the E-region can be expanded or contracted dependent on the need for a cache region. Further, it should be noted that although not shown disk 102 may include other types of regions including, for example, guard regions and write-twice cache regions. It should be noted that other types of magnetic recording techniques may incorporate techniques that allocate areas of a disk to be used as a write buffer area. Thus, disk 102 may be configured according to any combination of magnetic recording techniques As described above, data stored on disk 102 may be organized as data blocks. In some example embodiments, the disk drive can use address indirection to write blocks of data to disk 102. That is, host file systems deal with logical block addresses (LBAs) in commands to write blocks of data to disk 102 and read blocks of data from the disk 102 without regard for actual locations on the disk. The actual physical address is the physical block address (PBA) used internally by hard disk drive 100. Address indirection is typically implemented in the controller portion of the drive's architecture (e.g., hard disk controller 122) using indirection tables which are used to keep track of the physical location associated with a LBA. Put another way, the indirection tables map the LBA to a PBA in the disk drive 100.

Hard disk controller 122 can perform address indirection. When performing address indirection, the hard disk controller 122 translates the LBAs used in host commands (to write or to read information representing data) to an internal physical address, or an intermediate address from which a physical address can ultimately be derived. It should be noted in for a hard disk drive that utilizes SMR the physical block address (PBA) of a logical block address (LBA) can change frequently. Further, for an SMR hard disk drive, the LBA-PBA mapping can change with every write operation because the hard disk drive may dynamically determine the physical location on the disk where the data for an LBA will be written. Further, the data for the same LBA may be written to a different location the next time the host LBA is updated. In addition, a hard disk drive, such as hard disk drive 100, may autonomously move data between write caches in RAM, write caches on disk 102, E-regions on disk 102 and I-regions on disk 102. In some examples, the LBAs for the data may stay the same regardless of where the hard disk drive 100 has the data stored. Further, background processes, such as, for example, defragmentation may also be executed autonomously by hard disk drive 100 to move data sectors from one PBA to another while the LBA stays the same. Thus, hard disk drive 102 may be configured to use address indirection in associated with multiple types of write operations.

Interface processor 124 generally represents the portion of processing unit 120 configured to interface between servo processor 126 and hard disk controller 122. Interface processor 124 may perform predictive failure analysis (PFA) algorithms, data recovery procedures, report and log errors, perform rotational positioning ordering (RPO) and perform command queuing. In one example, interface processor may be an ARM processor.

As described above, data is typically written to or read from disk 102 in blocks or sectors contained on a track of a disk drive. The block sizes can be 256 bytes or 4096 bytes, in some embodiments. Disk 102 may also include one or more servo wedges that extend radially across the tracks of the disk. These wedges contain servo sectors and are circumferentially or angularly-spaced and are used to generate servo signals. A servo signal is a signal read from disk 102 that may be used to align slider 106 with a particular sector or track of disk 102. Server processor 126 generally represents the portion of processing unit 120 configured to control the operation voice coil motor assembly 110 to insure slider 106 is properly positioned with respect to disk 102. Servo processor 126 may be referred to as a Servo Hardware Assist Real-time Processor (SHARP). Servo processor 126 may be configured to provide closed loop control for any and all combinations of: slider position on track, slider seeking, slider settling, spindle start, and spindle speed. Further, servo processor 126 may include a set of instructions to calculate servo related variables.

For example, a servo signal read from disk 102 may be used by servo processor 126 to determine the amount of displacement of slider 106 from the center of a track. The value of this displacement may be referred to as run out. The value of this displacement may also be referred to as the position error signal (PES). Run out may include repeatable run out (RRO) caused by spindle assembly, or non-repeatable run out (NRRO) caused by internal or external vibrations. Run out is one example of a position accuracy associated with a read or write included in slider 106. If a measured value of NRRO is greater than a predetermined threshold, a write operation may be inhibited. This threshold may be referred to as write inhibit slice (Winh). In addition to servo signals, sensors such as vibration measurement unit 138 may provide information to servo processor 126 and/or processing unit 120 that allow processing unit 120 to calculate a position accuracy value associated with a head of slider 106. Vibration measurement unit 138 may be any device configured to measure vibration of hard disk drive 100 and/or disk 102 and provide a measurement to processing unit 120. In one example, vibration measurement unit 138 may include an accelerometer, or the like.

Figure 3:
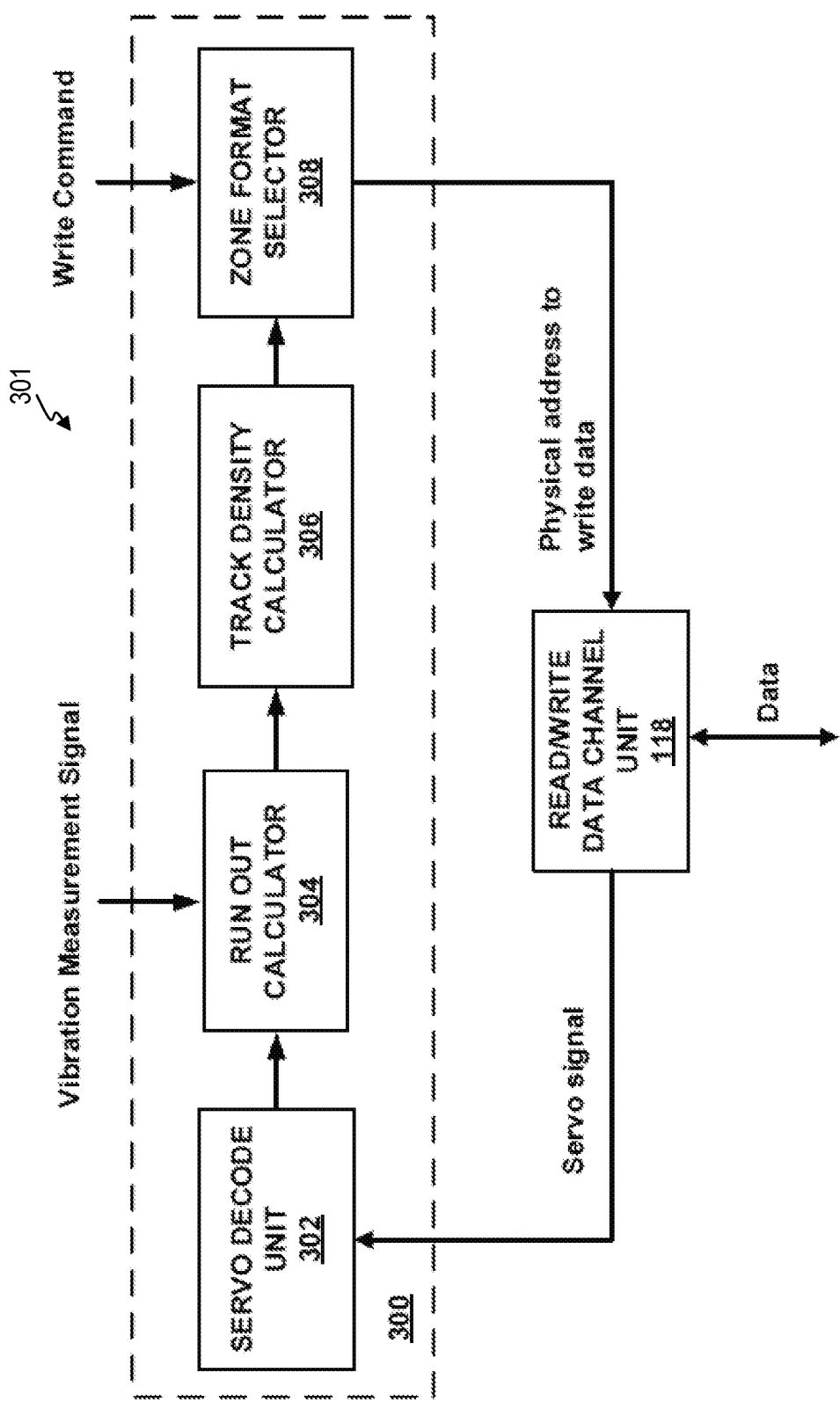
FIG. 3 is a schematic diagram of an example error correction unit, according to an example embodiment.

FIG. 3 is a block diagram illustrating an example error correction unit that may utilize techniques described in this disclosure. In the example illustrated in FIG. 3, error correction unit 300 is configured to receive a servo signal and/or a vibration measurement signal and output a physical address in conjunction with receiving a write command. The physical address corresponds to a location of a sector within a track on a disk surface. Of course, the track will be associated with one of the regions of the disk or disks, 210, 220, 230, 240, 250 or 260. As described above, address indirection may be used to map a logical address to a physical block address or physical address. It should be noted that although error correction unit 300 is illustrated as having distinct functional blocks, such an illustration is for descriptive purposes and does not limit error correction unit 300 to a particular hardware architecture. Functions of error correction unit 300 may be realized using any combination of hardware, firmware and/or software implementations. In one example, error correction unit 300 may be implemented as part of processing unit 120. Further, each component of error correction unit 300 may be included as part of hard disk controller 122, interface processor 124, and/or servo processor 126.

As illustrated in FIG. 3, error correction unit 300 includes servo decode unit 302, run out calculator 304, track density calculator 306, and zone format selector 308. As described above, the disk 102 has servo sectors which may be used to generate servo signals. Servo decode unit 302 may be configured to decode a servo signal read from a disk, such as disk 102, and determine a position of a read head and/or a write head with respect to a servo track. A data track does not necessarily correspond to a servo track. The data track can have a centerline that is offset from the centerline of a servo track. As mentioned herein, the tracks can be written with variable track pitch which means the track centers of the data tracks also vary. For example, the centerline of a data track depends on how much of the previous track is overwritten during shingled recording. The servo wedges and the servo tracks are generally rather precisely written. The data track may have a center that includes a fractional portion of a data track. In theory, the servo is used to position the read head precisely over the centerline of a data track in which a physical block, such as a sector, is located. In actuality, the servo positions near the centerline. In some disk drives, there may be as many as sixty servo wedges radiating out from the center of the disk. Other embodiments of disk drives include disks that have 400-500 servo wedges radiating out from the center of the disk. A feedback control loop is used to keep the read element or write element substantially on a centerline. The servo calculates a position error signal which is an amount offset from the centerline of the desired track. This is used in a feedback control loop that is used to power the VCM associated with the actuator arm and keep the read head or element substantially centered until the next sample can be taken at the next servo wedge.

As illustrated in FIG. 3, servo decode unit 302 may receive a servo signal from read/write data channel. Run out calculator 304 may be configured to receive a position error signal (PES) and calculate a run out value for a time window. In one example, a time window may be one second. In other examples, a time window may be greater or less than one second. In addition to or as an alternative to receiving a PES, run out calculator 304 may be configured to receive a vibration measurement signal and to calculate a run out value based at least in part on the vibration measurement signal. In one example, run out calculator 304 may receive a vibration measurement signal from vibration measurement unit 138. Once the repeatable run out value is known it can be used to enable track following by a read or write element. In addition, the repeatable portion of the run out can be removed from the PES thus leaving the nonrepeatable run out (NRRO) portion. Of course, some of the NRRO can be vibrations associated with the operating environment in which the disk drive operates. Thus, the value of the PES over time is one indicator or detector of the favorability of the operating environment in which the disk drive 100 is operating. Other vibration detection elements such as a vibration detection unit 138 may also be used to detect vibration. Such a vibration detection unit 138 may include one or more accelerometers, for example. It should be noted that there are many possible configurations for the vibration detection unit 138. It should also be noted that vibration may vary at different times. For example, if the disk drive 100 operates in an environment with loud music, the vibrations introduced may be greater than at night when there may be little or no music. In another example, vibrations may be introduced by other disk drives in a bank of disk drives which may be associated with a data warehouse. If the other drives are not operating or shut down for a time, the operating environment will likely be more favorable to using other writing techniques where the data capacity can be increased. The amount of increase in the capacity of the drive will, at least in part, depend on how favorable the environment becomes.

The disk drive 100 includes at least two I-regions to which different writing techniques can be used for storing information representing data. In one embodiment, the two I-regions could be on one disk or even one disk surface. In another embodiment, the disk drive 100 could include a disk 102 that has a plurality of actual disks. In this embodiment, the two I-regions could be on the two disks. In one I-region, PMR or one of the types of PMR could be written. For example, as shown in FIG. 2, the one region could be region 230 that is written with iPMR. In the other I-region 240, SMR could be written. As shown in FIG. 2, region 240 includes SMR that has been write verified. The iPMR region would have the advantages associated with PMR. In the iPMR region 230, data can be written to any track in that employs this technology. In other words, a disk drive using PMR or iPMR technology can easily handle random writes and generally can provide the performance of a disk drive that only handles PMR writing technologies. The SMR region 240 introduces the constraint that random writes may not be done in place. However, if the data to be written lends itself to a sequential writes, and if there is sufficient idle time to rewrite or "defrag" writes that were not initially written "in place", the SMR provides a capacity boost to the drive which may approach 150% of a disk drive using straight PMR technology.

The disk drive 100, can also be provided with one or more E-regions, such as E-region 260 (shown in FIG. 2). The E-region can be a region solely on the disk 102 or disks 102 of the disk drive 100 or can be a hybrid having a region on the disk 102 and a portion in solid state memory. The E-region 260 is a cache for information written to the disk drive 100. The information representing data can be rewritten from the E-region 260 to one of the I-regions of the disk drive 100. In some instances, this information could be held in solid state memory or on the disk 102. In other instances, this information could be held solely to the disk 102 or solely to the solid state memory. At a later time the information representing data can be written to one of the I-regions 230, 240 and removed from the E-region 260. In reality, the portion of the E-region 260 is merely designated as free space available for storing other information. This portion is then overwritten.

The disk drive can also move data amongst the I-regions 210, 220, 230, 240, and 250. For example, information representing data may be written in the iPMR region 230. If the disk drive 100 is found to be operating in a favorable environment, the disk drive 100 can rewrite the data to a region 210, 220, 240 that uses the SMR writing technology. In this way, the overall capacity of the disk drive 100 can be increased on the fly while out in the field where the disk drive 100 is operating. As mentioned above, the amount of overwrite of previously written tracks may also be adjusted. For example, if the disk drive 100 is found to be operating in a very favorable state with little vibration, the amount of overwrite can be more aggressive thereby resulting in thinner or less wide data tracks than when the disk drive is operating in an environment determined to be less favorable. Of course, to move the information representing data, there generally needs to be a sufficient amount of idle time to allow the shingled writing operation to take place. It is contemplated that a write command that arrives during a data move could be written to solid state memory during the write operation, in some embodiments, to insure the appropriate amount of idle time to complete the write operation, such as a shingled write. In other embodiments, it is contemplated that in another embodiment, the disk drive 100 produces a signal indicating that it is unable to execute a write command The shingled write is checked, in I-regions 210, 220 and 240 with a read operation to make sure the data is readable (i.e. write verify).

In one embodiment, the disk drive 100 includes an environmental monitor, a controller 120 and a writing mechanism 106. The controller 120 acts in response to an output from the environmental monitor to determine if the data capacity of a disk drive could be increased from a first value to a second value. The controller 120 determines the second increased value. The writing mechanism 106, controlled by the controller 120, writes data to the disk 102 to realize the increased data capacity of the disk drive 100. In one embodiment, the environmental monitor includes a plurality of position error signals (PES) obtained from a read element 106. More specifically, the read element 106 reads a servo pattern on the disk 102 and produces a PES. The PES indicates the position of the read head with respect to center of a track being read. These are reviewed over time and certain elements are removed, such as the repeatable run out, to produce a signal that can be used to determine how closely the read element is following a track. The more closely the read/write head 106 follows the track as depicted by the PES, the more favorable the operating environment of the disk drive. Operating in a more favorable environment is conducive to increases in the capacity of a region or regions of the disk drive. In another embodiment, the environmental monitor is a soft error rate from obtained from a read channel of the disk drive. When information representing data is read, there may be errors. Error correction codes are used to correct the errors as the data is read. The rate of the errors is another indication of a favorable environment. In still other embodiments, the environmental monitor includes an accelerometer, a vibration detector or the like.

A host computer 150, as mentioned above, issues write commands. The host computer can issue the command to write to logical block addresses. The disk drive can also take the command and place the information to be written at logical block addresses. The logical block addresses generally stay the same. The actual place where data is stored is at a physical block address. The disk drive may move data to another physical block address in the drive. The logical block address stays the same. The disk drive 100 and, more precisely the processing unit 120 and its associated memory 130 includes a table for mapping logical block plurality of logical blocks that correspond to a plurality of physical blocks of data on the disk drive. The disk drive 100 maintains the table that maps the logical block addresses to the physical block addresses. In one embodiment, the number of logical block addresses and physical blocks are initially set at a factory, to hold first amount of data. The plurality of logical block addresses have a starting logical block address, and an ending logical block address with the first value being a factory setting. The ending logical block address is increased to the second value greater than the first factory setting value by the controller 120 in response to an input from the controller 120. A host computer will query the disk drive 100 as to the ending logical block address after it has written to a portion or region of the disk 120. If the disk drive 100 was able to write more data than the original factory setting value it will return a new ending logical block address. The ending logical block address is increased to the second value greater than the first factory setting value by the controller 120 in response to an indication from the environmental monitor that the disk drive was operating in a favorable environment, such as an environment which would allow writing additional data to the region 210, 220, 230, 240, 250 and to disk 120. In one embodiment, the ending logical block address is increased to the second value greater value in response to a write verify of a set of data on the disk 120. The write verify is a read operation that verifies all that has been written is readable.

In another embodiment, the disk drive 100 includes at least a portion of the disk, such as region 210, 220, 230, 240, or 250 of a disk drive 100 having an area with a factory set logical block start address and a factory set logical block end address. The disk drive 100 also includes a writing mechanism, such as a write element in the slider 106, for writing information to the disk, and a reading element, such as a read element in the slider 106, for reading information from tracks on the disk 102. The disk drive 100 also includes an apparatus for producing a position error signal depicting the distance between the read element and the center of a track on the disk, such as the servo patterns and a memory of the track center of a particular track. The disk drive also includes a controller 120 that controls many aspects of the disk drive 100, the reading element and the writing mechanism.

The controller 120 includes a microprocessor that executes instructions 128 to cause to cause the read element to monitor the position error signal to determine when the disk drive is in a favorable environment. The instructions 128 cause the write element to write a first set of tracks having a first width and read the first set of tracks, and to write a second set of tracks having a second width, narrower than the first width. The read element, associated with the slider 102, reads the second set of tracks. The controller 120 also reset the factory set logical block end address to a higher value in response to reading the second set of tracks. In one embodiment, the second set of tracks have a second width written so that the errors in the information being read can be corrected on the fly. In another embodiment, the second width track is written so that the errors in the information as read occur at a rate that can be corrected. In still other embodiments, the second track is written so that the error rate less than a threshold error rate value. In some other embodiments, the second width is written so that the errors in the information being read are at a soft error rate less than a threshold value.

Figure 4:
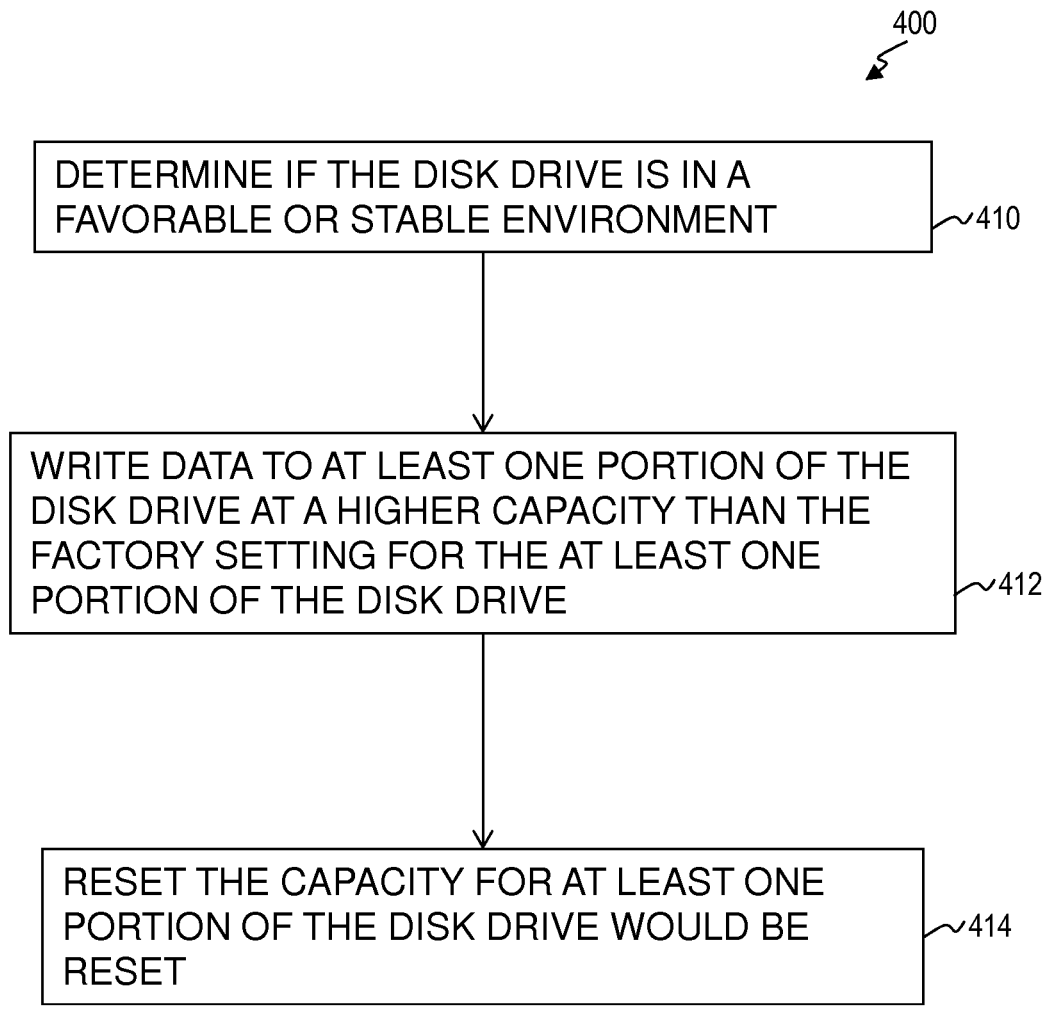
FIG. 4 is a flow diagram of a method for increasing the data capacity of a disk drive from the factory settings for data capacity, according to an example embodiment.

FIG. 4 is a flow diagram of a method 400 for increasing the data capacity of a disk drive from the factory settings for data capacity, according to an example embodiment. The method 400 includes determining if the disk drive is in a favorable or stable environment 410, and writing data to at least one portion of the disk drive at a higher capacity than the factory setting for the at least one portion of the disk drive 412. In response to a determination of a favorable or stable environment, and resetting the capacity for at least one portion of the disk drive would be reset 414. Determining if the disk drive is in a stable or favorable environment 410 includes reviewing a feedback from a read element of the disk drive, or reviewing a position of a read element with respect to a center of a written track on the disk drive. The method 400 can also include monitoring the error rate associated by reading previously written information. Resetting the capacity for at least one portion of the disk drive 414 includes increasing the number of logical block addresses for storage of information to a higher number than the number set at a factory or set at manufacture. This is done out in the field or in the environment where the disk drive operates on a day to day basis. In one embodiment, writing data to at least one portion of the disk drive, such as a region, 210, 220, 230. 240. 250 at a higher capacity than the factory setting for the at least one portion of the disk drive includes squeezing the tracks closer together in the at least one portion of the disk drive 100. In some embodiments, the method 400 also includes reading the information representing data to verify that the written information can be read. In still further embodiments, the method 400 includes compressing data as written. It should be noted that a disk drive could have one region or could have multiple regions.

Figure 5:
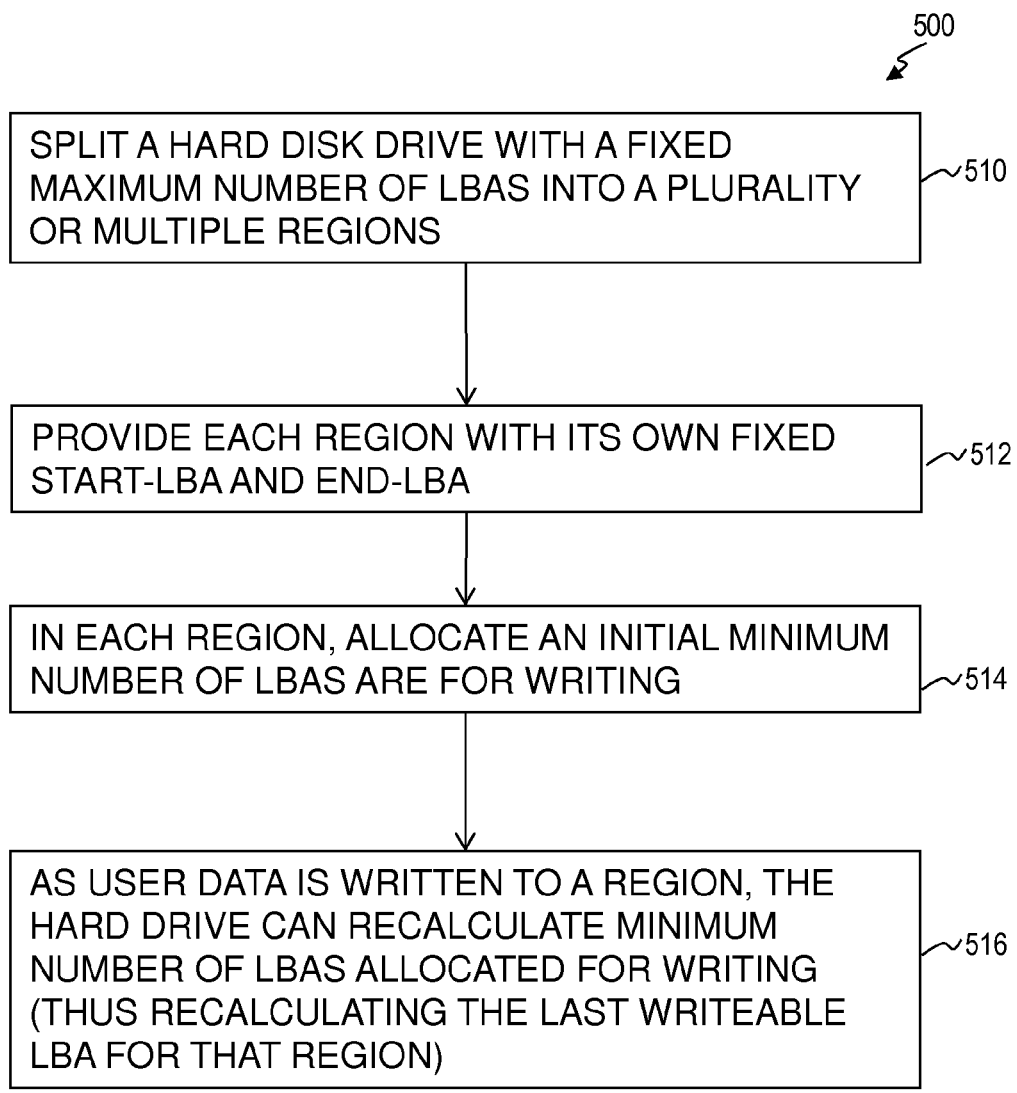
FIG. 5 is a flow diagram of another method for increasing the data capacity of a disk drive from the factory settings for data capacity, according to an example embodiment.

FIG. 5 is a flow diagram of another method 500 for increasing the data capacity of a disk drive from the factory settings for data capacity, according to an example embodiment. The method 500 includes splitting a hard disk drive with a fixed maximum number of LBAs into a plurality or multiple regions 510. Each region is provided with its own fixed Start-LBA and End-LBA 512. An initial minimum number of LBAs in each region are allocated for writing 514. Each region would, thus have a last writeable LBA which was less than the max LBA associated with the region. As user data is written to a region, the hard drive can recalculate minimum number of LBAs allocated for writing (thus recalculating the last writeable LBA for that region) 516. It should be noted that as data is further compressed or as the tracks are further squeezed, more LBAs are available to hold information related to user data. In short, more information can be written to a Region the more the data tracks were squeezed or the more the data is compressed. Generally, the calculations for the last writeable LBA in a region assume a worst case scenario or worst case environment, such that no further compression or squeeze could take place to make further space available.

Figure 6:
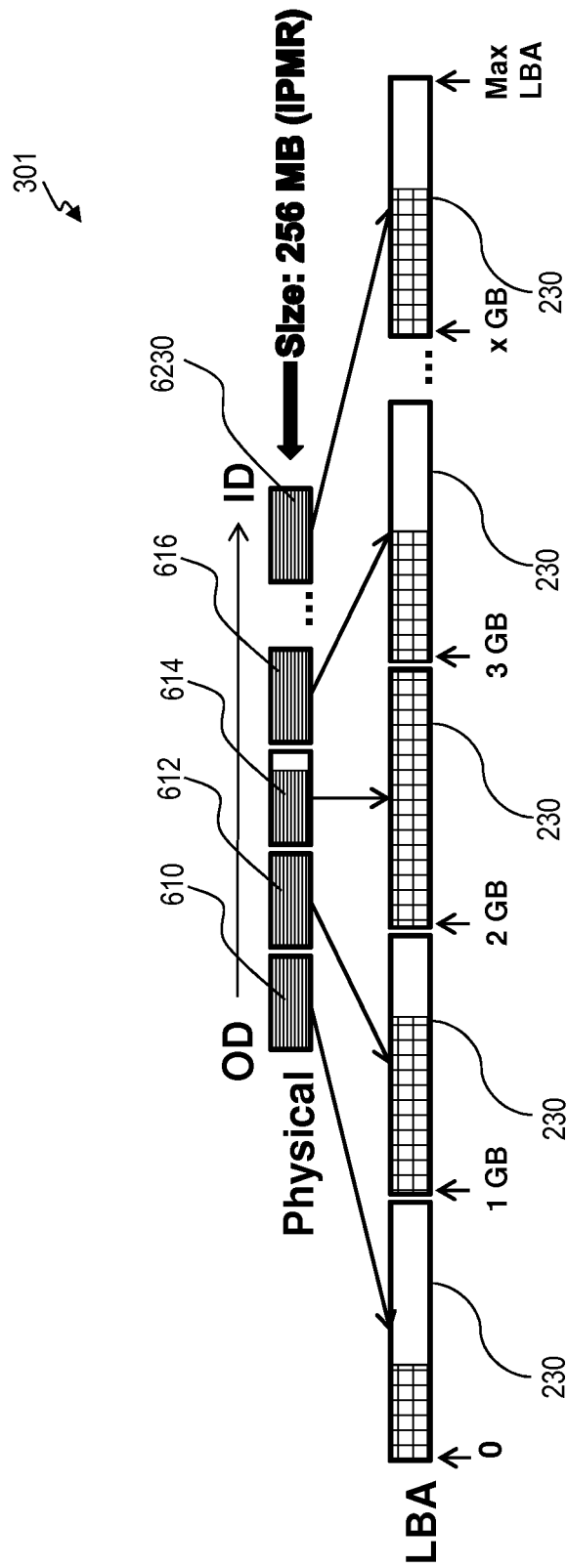
FIG. 6 is a schematic diagram of the disk drive which includes physical regions that have a plurality of tracks that include a plurality of physical block addresses, and which include a plurality of groupings of logical block addresses which correspond to the regions, according to an example embodiment.

FIG. 6 is a schematic diagram of the disk drive 100 which includes physical regions 610, 612, 614, 616, 618 that have a plurality of tracks that include a plurality of physical block addresses, and which include a plurality of groupings of logical block addresses 620, 622, 624, 626, 628 which correspond to the regions 610, 612, 614, 616, 618, according to an example embodiment. The disk drive 100 is divided into regions 610, 612, 614, 616, 618 which will include physical block addresses. The regions 610, 612, 614, 616, 618 are physical regions on the disk 102. It should be noted that the regions 610, 612, 614, 616, 618 can be on one major surface of a single disk or on several disks in a disk stack. In one embodiment, each of the regions are given a starting logical block address, an ending logical block address, and a maximum logical block address. The max LBA is fixed for the life of the device. The max LBA general represents 3-4 times the physical iPMR capacity. The region start LBAs are also fixed for the life of the device. In one embodiment, the LBAs are mapped linearly to physical regions in an OD to ID fashion to maintain expectation that lower LBAs have higher data rate. As shown in FIG. 6, the physical block addresses correspond to 256 MB physical iPMR regions 610, 612, 614, 616, 618. The physical regions 610, 612, 614, 616, 618 are represented by LBAs 620, 622, 624, 626, 628 that allow 1 GB of logical space per region. The extra space allows for gains in the PBAs from standard iPMR when the information is written using an alternative writing technique, such as SMR, Write Verify, Dynamic Track Squeeze and Compression. Therefore the LBA max and LBA min are set for life at the time of manufacture. At the factory or at time of manufacture, an LBA end which is between the LBA min and LBA max is set. In the example shown in FIG. 6, the LBA end is set so if all the LBAs were filled using an iPMR writing technique, the PBA corresponding to the LBA would be filled with 256 K of data. This is a worst case scenario. Of course, the PBA can be written so that more data can be stored in the physical space associated with the PBA. This is accomplished by determining that the disk drive 100 is operating in an environment exhibiting favorable conditions and writing using another technique. The amount of user data that can be written to a Region 610, 612, 614, 616, 618 is unknown initially and remains only an estimate until the Region is actually completely filled with user data. In operation, the region is used for storing data until the end LBA is reached. The host computer then queries or polls the disk drive as to whether additional space is available. If available, the disk drive responds with a new LBA end value. The additional space can then be allocated by the host for new write operations. It should be noted that some regions may have larger physical regions associated with them (esp. regions positioned near the OD). In other embodiments, multiple physical regions are mapped to one logical region.

The size of the regions 610, 612, 614, 616, 618 can be varied or can be of the same size. In one example embodiment, the Regions 610, 612, 614, 616, 618 are of equal maximum LBA size. In another embodiment, multiple regions of equal size can be combined in one or used as part of one LBA. In another embodiment, the regions are of unequal size. In another embodiment, Max-LBA is three to four times the physical iPMR data capacity to allow for gains from other magnetic writing techniques, such as SMR, SMR with write verify, track squeeze, compression, or the like. In some embodiments, the LBAs are mapped from OD to ID (e.g., lower LBAs have higher data rate). The host 150 stores current parameters of hard disk drive 100, and in other embodiments the host 150 can poll the hard drive 100 for its current parameters.

A computer system includes a host 150 and a disk drive apparatus 100 communicatively coupled to the host 150. The disk drive 100 includes at least one disk 102 having two major surfaces divided into a plurality of regions 610, 612, 614, 616, 618, as shown in FIG. 6. LBAs 620, 622, 624, 626, 628 are associated with the regions 610, 612, 614, 616, 618. The regions 610, 612, 614, 616, 618 includes a start logical block address and a maximum logical block address. The host 150 sets a region as allocated and requests the last logical block address (end LBA) for the region 610, 612, 614, 616, 618. The host 150 frees the allocation up to the last logical block address (end LBA) in response to disk drive returning the last logical block address (new end LBA), and after last logical block address is consumed, host requests last logical block address again. The host, in response to receiving an increased end logical block address indication for a region, frees the space associated with the region between the increased end logical block address and the previous end logical block address. The host 150 issues write commands and read commands to the disk drive 100. The write command is for storing information representing data to a disk surface 102 within the disk drive 100. The read command is for retrieving information representing data from a disk surface 102. In one embodiment, the host 150 provides an indication of a type of data associated with a write command. The write element, associated with the slider 106, is positioned by the controller 120 to overwrite at least a portion of a previously written track in the second region, in some embodiments. In still some other embodiments, the host 150 compresses some types of data. When compressed data is written to a region of the disk drive it effectively increases the data density and capacity of the disk drive. When compressed, there is less information representing data for a given amount of data when compared to uncompressed data. Accordingly, when compressed, the information representing the data takes up less space. Therefore, there is more space available after writing compressed data to a PBA.

In one embodiment, the disk drive 100 includes an E-region, such as E-region 260 in FIG. 2. The disk drive 100 writes information representing data to the E-region 260 and returns a write complete response to the host 150. In some instances, the disk drive 100 initially writes information representing data associated with a write command to the E-region 260, and moves the information representing data from the E-region 260 to at least one of the plurality of I-regions 210, 220, 230, 240, 250 during an idle time of the disk drive 100. The disk drive includes a plurality of write methods for writing information representing data to the plurality of I-regions of the disk drive 100. A default write type is perpendicular magnetic recording.

A disk drive 100 having at least one disk 102 with at least two major disk surfaces comprising a first I-region 210 having a first maximum logical block address, a second I-region 220 having a second maximum logical block address, and an E-region 260. In one embodiment, information representing data is initially written to the E-region. The information representing data is reread and written to at least one of the first I-region or the second I-region. In another embodiment, the information representing data is written directly and sequentially into the first I-region and the second I-region. In some embodiments, the information written to the first I-region 210 is written using a first method and the information written to the second I-region 220 is written using a second method. One of the first or the second region includes a plurality of tracks written using perpendicular magnetic recording. The other of the first or the second region includes a plurality of tracks written using shingled perpendicular magnetic recording. In another embodiment, the other of the first or the second region includes a plurality of tracks written using shingled perpendicular magnetic recording with write verify. In some embodiments, the other of the first or the second region includes a first band near the innermost diameter of the other of the first or the second region and a second band near the innermost diameter of the other of the first or the second region. In still another embodiment, the other region includes a plurality of tracks written after compressing the information representing data.

The disk drive 100 includes physical block addresses where data is stored. The physical block address relates to the actual physical address of a set of data. In actuality, a set of logical block addresses are assigned to a set of physical block addresses that make up a region. The logical block addresses are then associated with the actual location of the data. A table is kept of the logical block address of the data and its location in at a physical block addresses. At times, the data may be moved. The logical block address associated with the data, stays the same despite a new physical block address. The disk drive 100 includes a table which is changed to reflect current PBA for the data associated with a LBA. The disk drive 100, it is said, includes logical block addresses which are mapped to physical block addresses. At least one of the first end logical block address or the second end logical block address is reset to a value higher than the at least one of the first end logical block address or the second end logical block address after writing to at least a portion of the first region or the second region, respectively. In other words, the regions can be written so as to hold more data than originally designed to hold.

In many instances, the data capacity is designed to a less than perfect case scenario. The conditions where a disk drive operates can, many times, be more favorable than the design point. When a favorable condition or conditions are detected, the write operations can be controlled to write data that will have increased capacity. Of course, in other embodiments, the conditions may be even worse than the design point. In this case, the capacity of the disk drive could be decreased. The reset first end logical block address or the reset second end logical block address reflects an increase in the capacity of at least one of the first I-region or the second I-region. The increase in capacity results from the method for writing to the respective I-region. The disk drive 100 further includes a controller 120 for determining the increase in capacity for the respective I-region. The controller 120 monitors the disk drive 100 for conditions favorable to writing at an increased capacity. The controller 120 also determines the write method to use to increase capacity. The controller 120 also determines when the drive is likely to be idle for a period of time so that it can perform writes that may take longer to complete during the idle times. In some embodiments, history of usage of the drive is maintained in the disk drive 100 so that idle times can be predicted. In some embodiments, a disk drive 100 has a plurality of disks which have two major surfaces for storing information for storing data. In some embodiments, the first I-region is located on one disk and the second I-region is located on another disk in the disk drive.

Figure 7A:
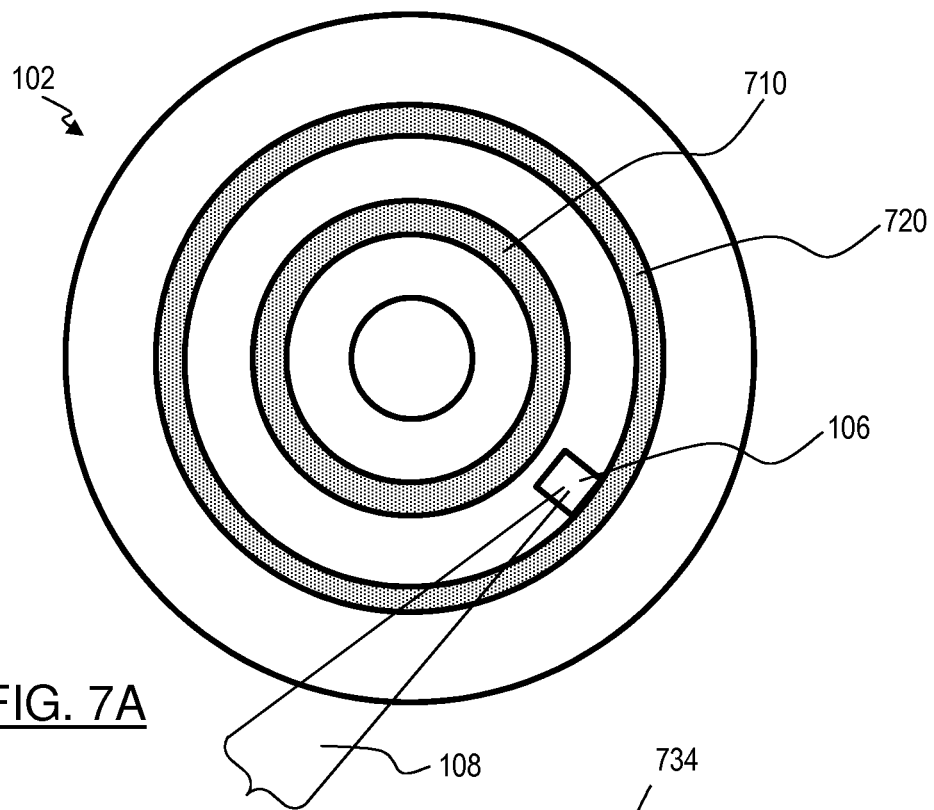
FIG. 7A shows a disk of a disk drive, according to still another example embodiment.
Figure 7B:
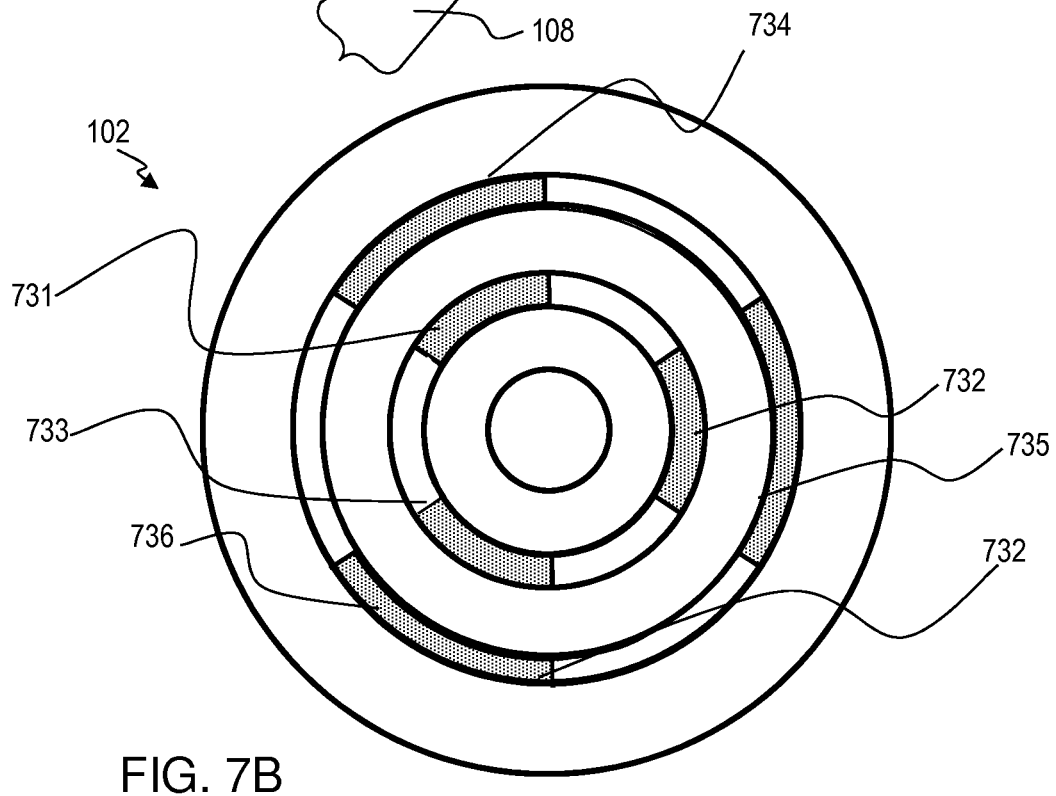
FIG. 7B shows a disk of a disk drive that has rotational copies of information representing data, according to an example embodiment of RPM multiplication.
Figure 7C:
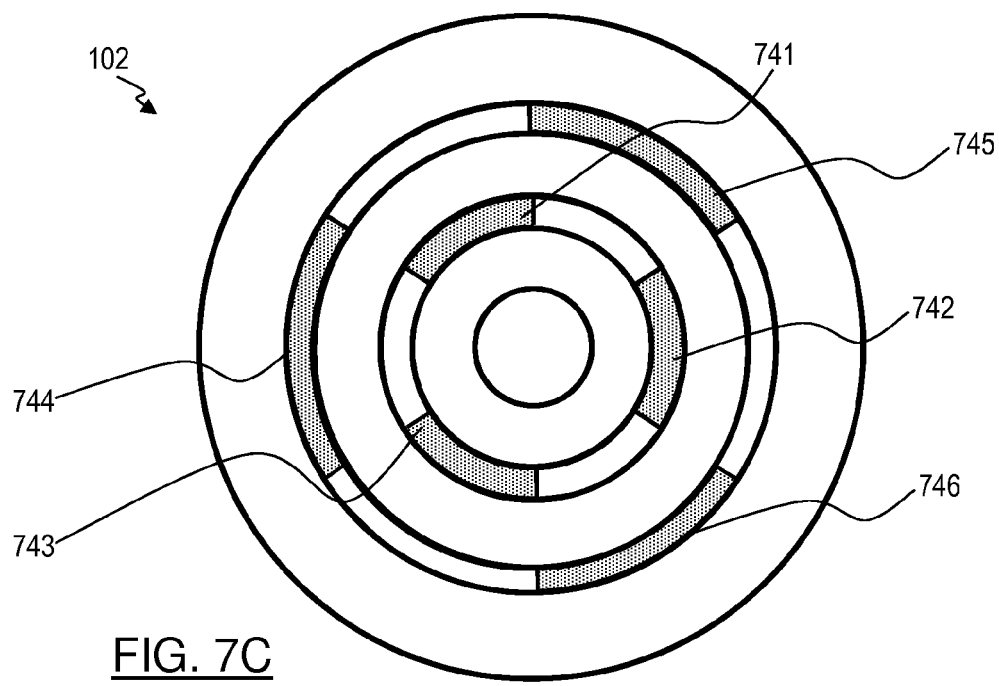
FIG. 7C shows a disk of a disk drive that has another embodiment of rotational copies of information representing data, according to another example embodiment of RPM multiplication.

FIGS. 7A, 7B and 7C show a disk 102 of a disk drive 100 that includes various embodiments for RPM multiplication, according to another example embodiment. FIG. 7A shows a disk 102 of a disk drive 100 that has radial copies of information representing data, according to an example embodiment. In this embodiment, substantially the same information representing data is written in the first I-region 710 and the second I-region 720 on the disk 102. The first I-region 710 and the second I-region 720 are located at different radial distances from the center of the drive. In some embodiments, the first I-region 710 and the second I-region 720 are located on different surfaces of the disk and therefore under different sliders and read elements. This technique allows for shorter seeks and faster recovery of information representing data when written at two different radial positions with respect to the center of the disks. As shown in FIG. 7, the first I-region 710 is closer to the slider and the read element housed therein than the second I-region 720. Therefore, data in the first I-region 710 and the second I-region 720 are located at different distances from the actuator arm 108 and from the slider 106 attached thereto. When a read command is issued, the disk drive can seek to the one of the first I-region 710 and the second I-region 720 which is closer to the slider 106 and the read element housed with the slider.

FIG. 7B shows a disk 102 of a disk drive 100 that has rotational copies of information 731, 732, 733, 734, 735, and 736 representing data, according to an example embodiment of RPM multiplication. FIG. 7C shows a disk 102 of a disk drive 100 that has another embodiment of rotational copies of information representing data 741, 742, 743, 744, 745, 746, according to another example embodiment of RPM multiplication. The load beam and slider have been removed from FIGS. 7B and 7C for the sake of clarity. In each instance the rotational copies are located at various rotational positions around the disk 102. As shown in FIG. 7B, the areas of duplicate data are located at the same angular position in a region closer to the inner diameter and in a region closer to the outer diameter of the disk. The data can be shifted rotationally so that it may be closer to a slider carrying a read element at any given time. FIG. 7C shows rotational copies located around the disk 102. The areas 741, 742 and 743 are offset from the areas 744, 745, and 746. The areas can be paired in anyway in which one area 741 may have a copy of the data at 746, for example. The areas 731, 732, 733, 734, 735, and 736 could also be carrying the same data.

Figure 8:
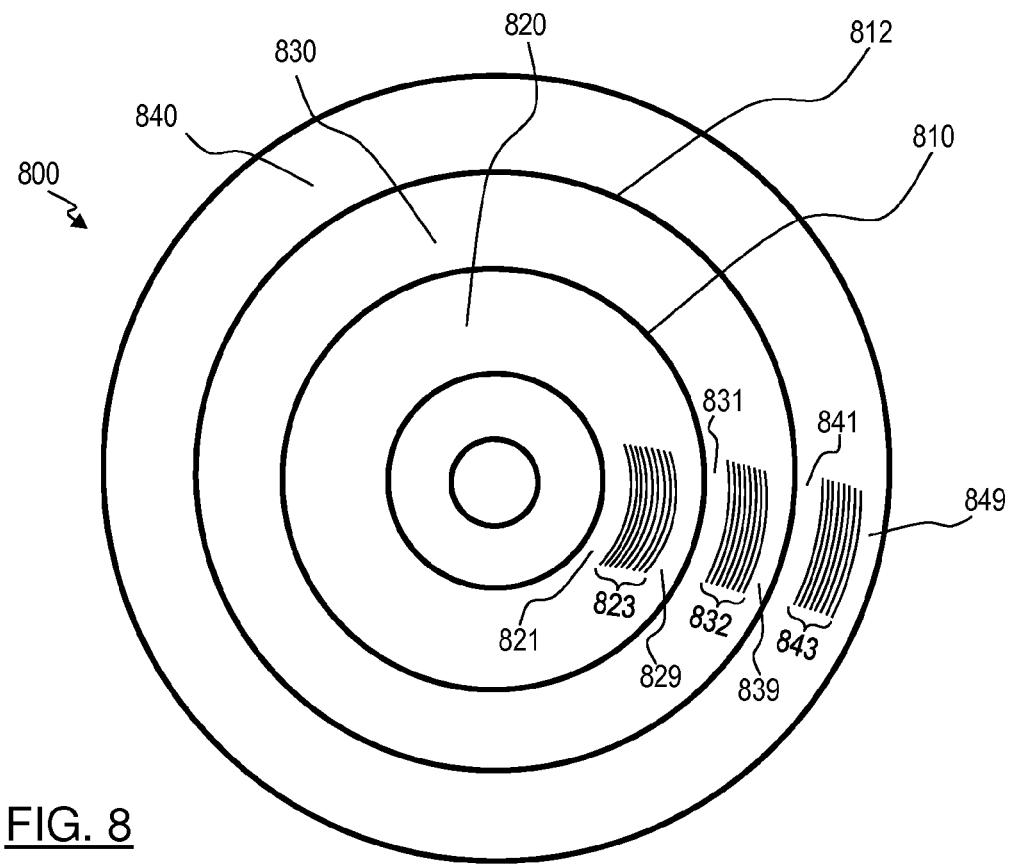
FIG. 8 is a schematic diagram of a disk drive that uses banded recording, according to an example embodiment.

FIG. 8 is a schematic diagram of a disk drive 800 that uses banded recording, according to an example embodiment. The disk drive 808 includes a disk 802 which can be a single disk or which can be a stack of disks. The disk you to includes I-region 820, I-region 830, and I-region 840. The disk 802 also includes a first guard band 810 and a second guard band 812 which borders I-region 830. The bands 810 and 812 isolate I-region 840 from I-region 830, and I-region 820 from I-region 830. The guard bands 810, 812 provide an extra spacing between the tracks located in I-region 830 and the adjacent I-regions 820, 840. The guard bands 810, 812 are placed between I-regions of the disk so that the region 830, if written with shingled magnetic recording, can be defragged while maintaining the shingling constraints. Of course a guard band 810, 812 does not hold data or information representing data and therefore the goal is to minimize the size of the guard band 810, 812. When adjacent I-regions, such as I-regions 830 and 840, are written with very thin tracks, such as those produced by shingled magnetic recording, they tend to be more prone to far track interference (FTI). This becomes more pronounced when one of the I-regions is defragged a number of times. In order to minimize FTI, the tracks near guard band are written wider than the other tracks in the I-region. As shown in FIG. 8, I-region 830 includes a multiplicity of tracks. Tracks 831 and 839 are wider or have a greater width than the tracks between tracks 831 and 839. This reduces problems associated with FTI, such as partial erasure of tracks in the adjacent I-regions 820, 840.

In one example embodiment, a region, such as I-region 830 is bounded by a band or guard band 810 to isolate the region 830. A disk drive 100 having at least one disk 802 with a major disk surface that includes a first region 830 including tracks having a first track width 833 and a second track width 839. The second track width 839 is wider than the first track width 833. The disk drive also has a second region 840 including tracks having a third track width 841 and a fourth track width 843. The third track 843 width being wider than the fourth track width 841. A guard band 812 is positioned between the first region 830 and the second region 840. The second track 839 and the third track 841 are positioned adjacent the guard band 812. The first region 830 includes a plurality of tracks between the first track 841 and the second track 843. The second region 840 also includes a plurality of tracks between the third track 841 and the fourth track 843. The tracks of disk drive 100 also includes the first region 830 positioned near the second track 839 having track widths that are wider than the tracks positioned near the first track 833, and the tracks of the second region positioned near the third track 843 having track widths that are wider than the tracks positioned near the fourth track 841. In one embodiment, the tracks between the first track and the second track have increasing track widths from the first track to the second track. In another embodiment, the track widths of a plurality of tracks positioned between the first track and the second track are constantly expanded. The disk drive 100 also includes a write element, for writing information representing data, a read element for reading information from a track on the disk. The read element and the write element are associated with the slider 108. The disk drive 100 also includes a controller 120 for controlling at least the position of the write element as information representing data is written to the track. In one embodiment, the write element is positioned by the controller 120 to overwrite at least a portion of a previously written track in at least one of the first region 830 and the second region 840. In one embodiment, the write element is dynamically controlled to overwrite at least a portion of a previously written track in at least one of the first region in 830 and the second region 840. In other words, the amount of overwrite can be controlled on the fly after the disk drive is placed in its operating environment outside the factory. The capacity of the disk drive 100 therefore can vary as a function of the environment in which is located. Some environments are very conducive to squeezing the tracks or overwriting adjacent tracks (such as wondering SMR) while other environments are less conducive with respect to using these techniques. The more tightly or higher the track density, the higher the capacity of the drive 100. Using the above-described technique allows the disk drive capacity to be increased in its operating environment after it has left the factory for manufacturing site.

A disk drive has at least one disk one with a major disk surface having a first region 820 including tracks having a first track width 823 and a second track width 829. The second track width 829 being wider than the first track width 823. The disk drive 800 also has a second region 830 including tracks having a third track width 831 and a fourth track width 839 and a fifth track width 833. The third track width 831 and the track having the fourth track width 839 being wider than the track having the fifth track width 833. The disk drive 800 also has a third region 840 including tracks having a sixth track width 841 and a seventh track width 843. The sixth track width 841 being wider than the track having the seventh track width 843. The disk drive 800 also includes a first guard band 810 and a second guard band 812. The first guard band 810 is positioned between the first region 820 and the second region 830. The track having the second track width 829 and the track having the third track width 831 positioned adjacent the first guard band 810. The second guard band 812 is positioned between the second region 830 and the third region 840. The track having the fourth track width 841 and the track having the sixth track width 843 are positioned adjacent the second guard band 812. The track having the fifth track width 843 is positioned between the track having the third track width 841 and the track having the fourth track width 849. The disk drive 800 also includes a write element for writing information representing data, and a read element for reading information from a track on the disk, and a controller 120 for controlling at least the position of the write element as information representing data is written to the track. The write element is positioned by the controller 120 to overwrite at least a portion of a previously written track in the second region 830. The write element is dynamically controlled to overwrite at least a portion of a previously written track in the second region 830.

Figure 9:
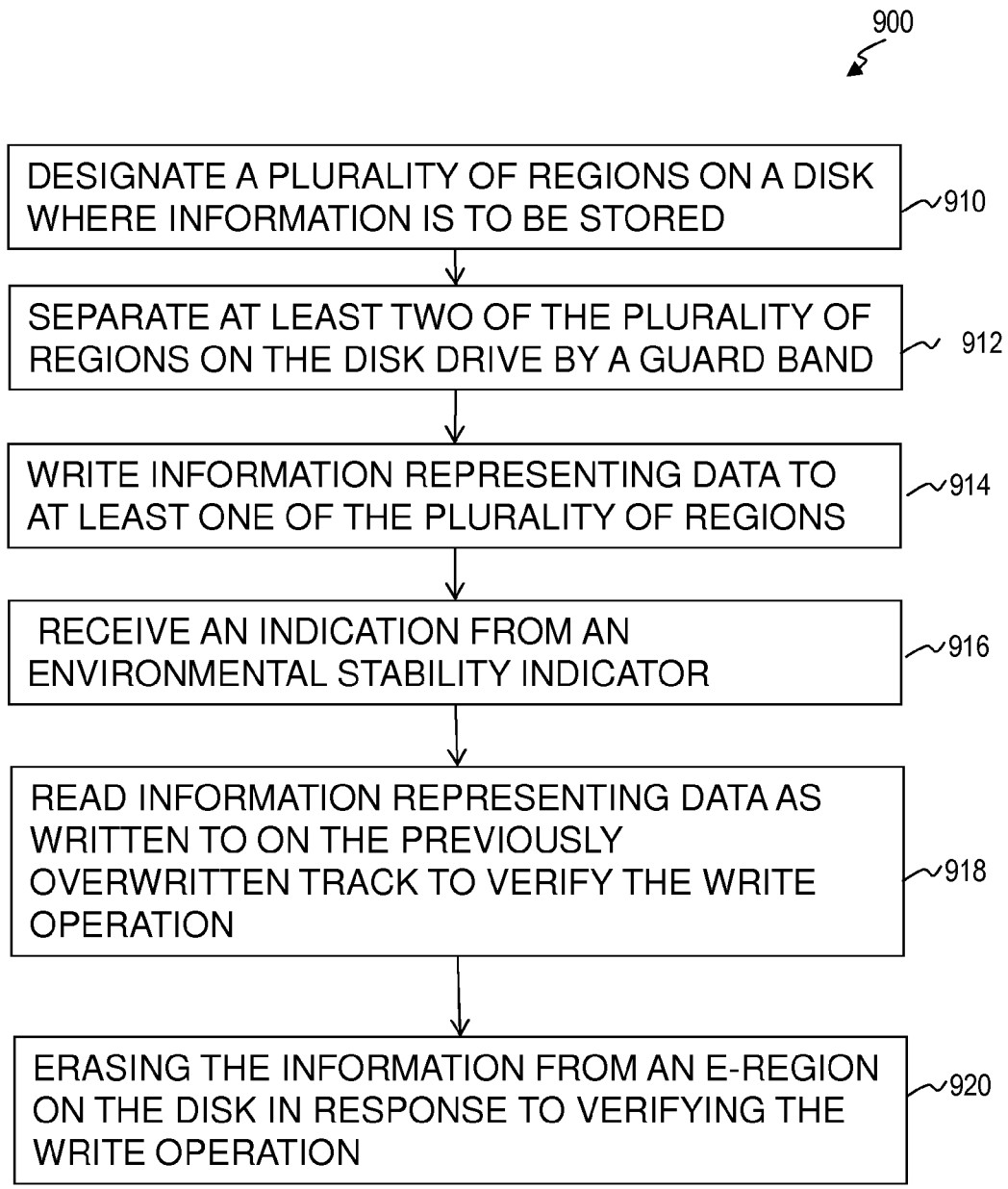
FIG. 9 is a flow diagram of a method for decreasing far track interference on a disk drive, according to an example embodiment.

FIG. 9 is a flow diagram of a method 900 for decreasing far track interference on a disk drive, according to an example embodiment. The method 900 includes designating a plurality of regions on a disk where information is to be stored 910, separating at least two of the plurality of regions on the disk drive by a guard band 912, and writing information representing data to at least one of the plurality of regions 914. The information is written to one or more tracks within the region of the disk. The track adjacent at least one of the guard bands of the region has a width greater than a track an area in the middle of the region. In one embodiment, writing information to the disk in the at least one region includes overwriting at least a portion of a previously written track. The amount of overwriting is dynamically variable to vary the capacity of the disk drive apparatus. The method 900 also includes receiving an indication from an environmental stability indicator 916. Writing information to the disk in the at least one region includes overwriting at least a portion of a previously written track, and the amount of overwriting in response to an output from the environmental stability indicator. The amount of overwriting is dynamically variable and in response to an output from the environmental stability indicator. In one embodiment, the method 900 and includes reading information representing data as written to on the previously overwritten track to verify the write operation. In one embodiment, the method includes erasing the information from an E-region on the disk in response to verifying the write operation 920.

Figure 10:
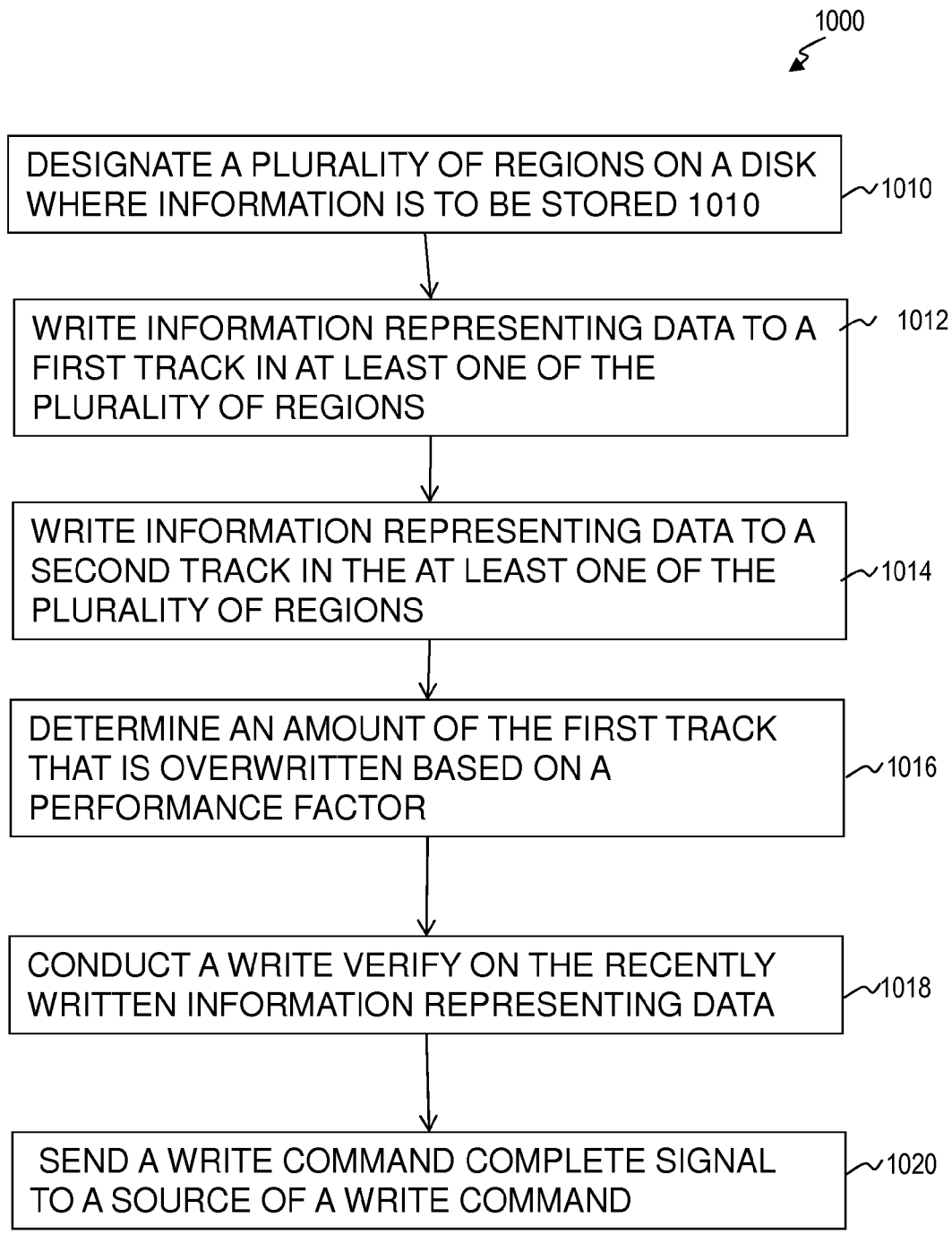
FIG. 10 is a flow diagram of a method for writing information to a magnetizable disk surface on a disk drive, according to an example embodiment.

FIG. 10 is a flow diagram of another method 1000 for writing information to a magnetizable disk surface on a disk drive, such as disk drive 100, according to an example embodiment. The method 1000 includes designating a plurality of regions on a disk where information is to be stored 1010, writing information representing data to a first track in at least one of the plurality of regions 1012, writing information representing data to a second track in the at least one of the plurality of regions 1014, the information written to the second track overwriting a portion of the first track, and determining an amount of the first track that is overwritten based on a performance factor 1016. Determining an amount of the first track that is overwritten 1016 is done or accomplished on the fly. The amount to overwrite the track is done in the field rather than in a factory or manufacturing facility. The method 1000 can also include conducting a write verify on the recently written information representing data 1018. This assures that the data written can be retrieved at a later date. In still another embodiment, the method 1000 includes writing information representing data to an E-region before writing the information representing data to one of the plurality of designated regions, conducting a write verify on the information representing data written to the one of the plurality of designated regions, and making the portion of the E-region that stored the verified information available in response to a positive write verification. The method 1000 also includes sending a write command complete signal 1020 to a source of a write command after writing information representing data to an E-region. In another embodiment, the size of the E-region can also be changed on the fly. The method 1000, in some embodiments, includes writing information representing data to an E-region before writing the information representing data to one of the plurality of designated regions and conducting a write verify on the information representing data written to the one of the plurality of designated regions.

Figure 11:
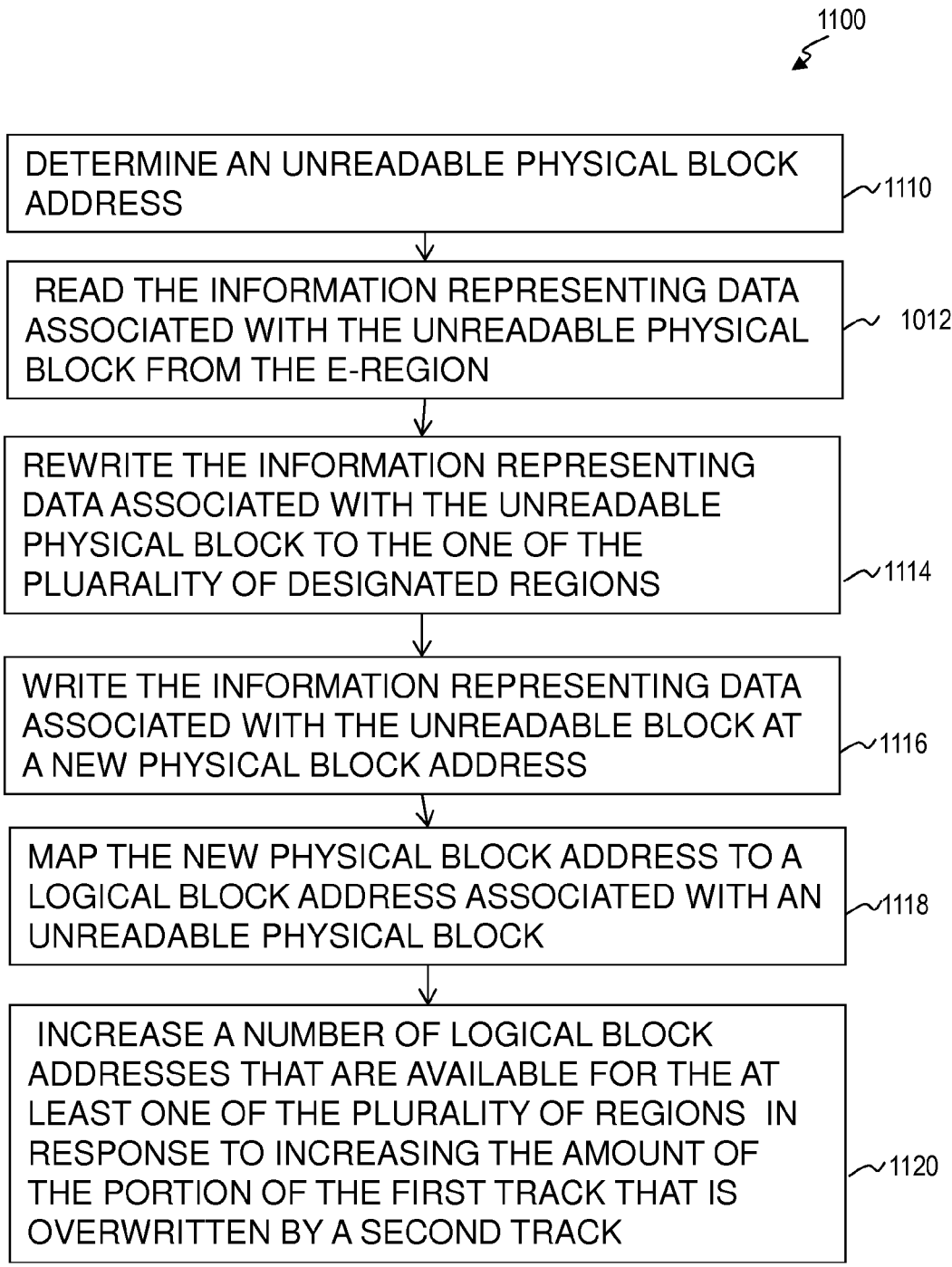
FIG. 11 is a flow diagram of a method for moving unreadable blocks of information representing data to another readable area on the disk, according to an example embodiment.

In response to a negative write verification a method 1100 is implemented, as shown in a flow diagram of FIG. 11. An unreadable physical block address is determined 1110, the information representing data associated with the unreadable physical block from the E-region is read 1112, and the information representing data associated with the unreadable physical block to the one of the plurality of designated regions is rewritten 1114. The method 1100 also includes writing the information representing data associated with the unreadable block at a new physical block address 1116, and mapping the new physical block address to a logical block address associated with an unreadable physical block 1118. In one embodiment, rewriting information representing data associated with the unreadable physical block includes rewriting the information from the unreadable physical block and all information written thereafter to the disk in the at least one region.

In addition, the method 1100 also includes increasing a number of logical block addresses that are available for the at least one of the plurality of regions 1122 in response to increasing the amount of the portion of the first track that is overwritten by a second track.

Figure 12:
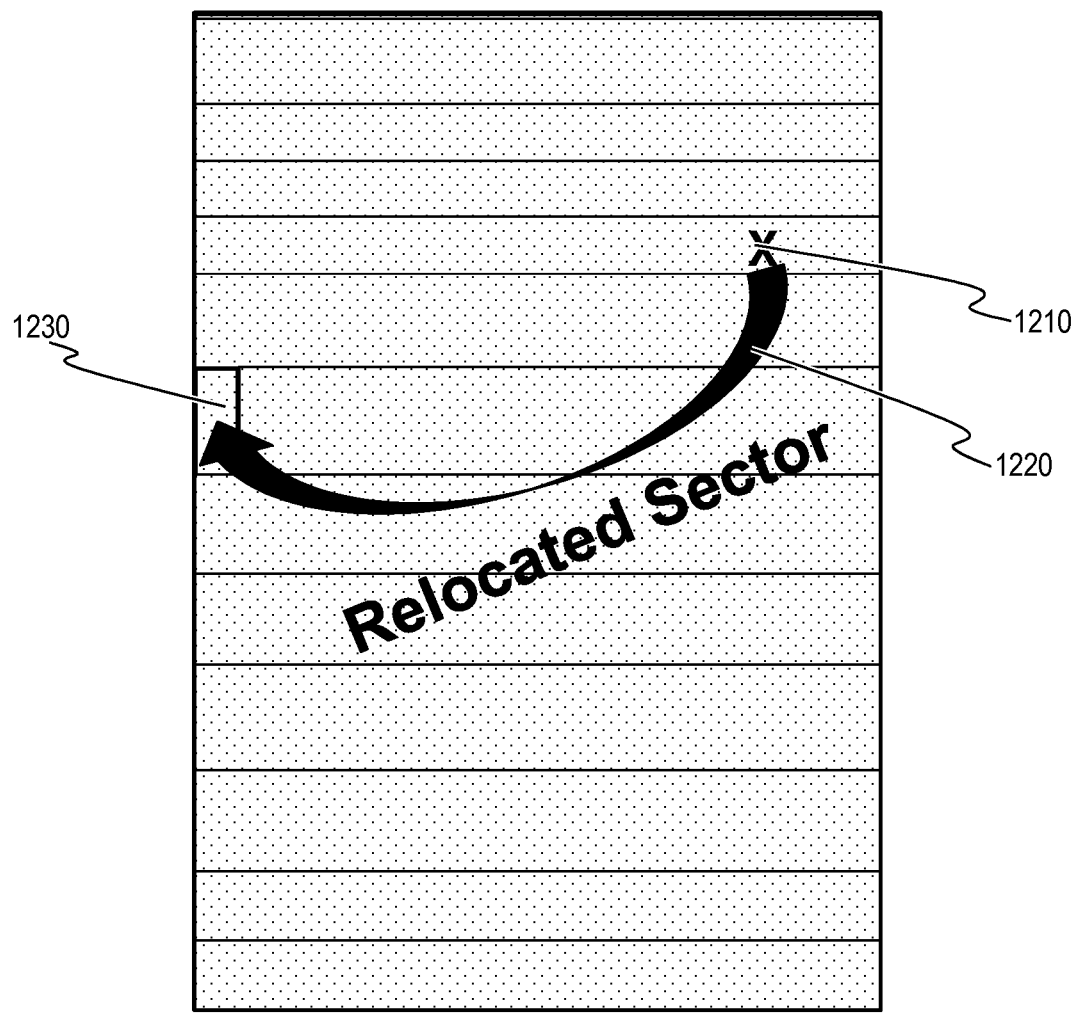
FIG. 12 is a schematic diagram showing the transfer of data from one physical block address or one set of physical block addresses to another physical block address or another set of physical block addresses, according to an example embodiment.

FIG. 12 is a schematic diagram showing the transfer of data from one physical block address or one set of physical block addresses to another physical block address or another set of physical block addresses according to an example embodiment. As shown in FIG. 12, a physical block address or a set of physical block addresses is found to be unreadable or bad. This is depicted by position 1210 on the disk 102 of the disk drive 100 (shown in FIG. 1). The arrow 1220 represents the data being "moved" from the unreadable or bad area 1210 to a new area which includes one or more new physical block addresses, as depicted by area 1230. In actuality, the data is read from a cache area, such as a cache memory associated with the disk drive 100 (not shown) or an E-region 260 which is on the disk 102 of the disk drive 100. There are generally two options when an area is determined to be unreadable and a sequential writing method is being used on a region. In the first option, the unreadable portion is so marked and the physical block address is marked as unreadable. The information that was to be stored there is moved to a different position and the physical block address corresponding to the LBA is updated to associate the new PBA with the LBA. This is generally done when a comparatively large amount of data has been written to the area after the unreadable portion, such as in a sequential write method like shingled magnetic recording. A second option is to rewrite the information after the unreadable PBA. The information to be stored in the unread portion and in the PBAs following the unread portion are retrieved and stored for rewriting. The disk drive issues a TRIM command to indicate that all the PBAs after the unreadable portion have been made available for rewriting or effectively trimmed. The unreadable portion is removed and not written to. This portion of the disk surface will generally be marked as bad or defective. The second option includes writing the retrieved information to the PBAs on the disk that follow the unreadable portion.

HDD disks are generally designed to accommodate predictable vibrations caused by normal operations. Generally, parameters are set for data capacities of each of the regions of a disk drive when at the manufacturing site. In some embodiments, the parameters may be set for a worst case scenario when at the manufacturing site. In some instances, disk drives (HDD) may be subjected to vibrations caused by normal operation of the disk drive or by ambient conditions. In other instances, a disk drive can be placed in a less favorable environment. For example, an HDD may be coupled to a device with speakers that introduce severe vibrations which can reduce the ability of a write head to accurately maintain an alignment with respect to a track of a disk. Severe vibrations may cause Track Mis-Registration (TMR) and a HDD may not be able to perform write operations due to TMR. In still other instances, the disk drive can be placed in environments where the conditions are more favorable to writing data than the design point which was set at a factory or manufacturing site. In other words, the disk drive can be placed in environments where the conditions are more favorable to writing data so that the capacity of the drive could be increased beyond the factory settings.

The hard drive 100 is divided into regions, each of which may be one of several types. These include both PMR and SMR, but may also include other types like SMR w/write verify, banded, banded w/write verify and RPM multiplication to name a few. The hard drive 100 can decide based on actual usage which type to use and may switch between them at runtime. The extra capacity may be used internally to improve performance or provided to the customer using dynamic variable capacity mechanisms. During idle, SMR regions (banded & auto) can be converted into SMR w/Write Verify regions. The extra capacity is not exposed to the customer for this region. Autonomous regions may be written w/verify originally.

Figure 13:
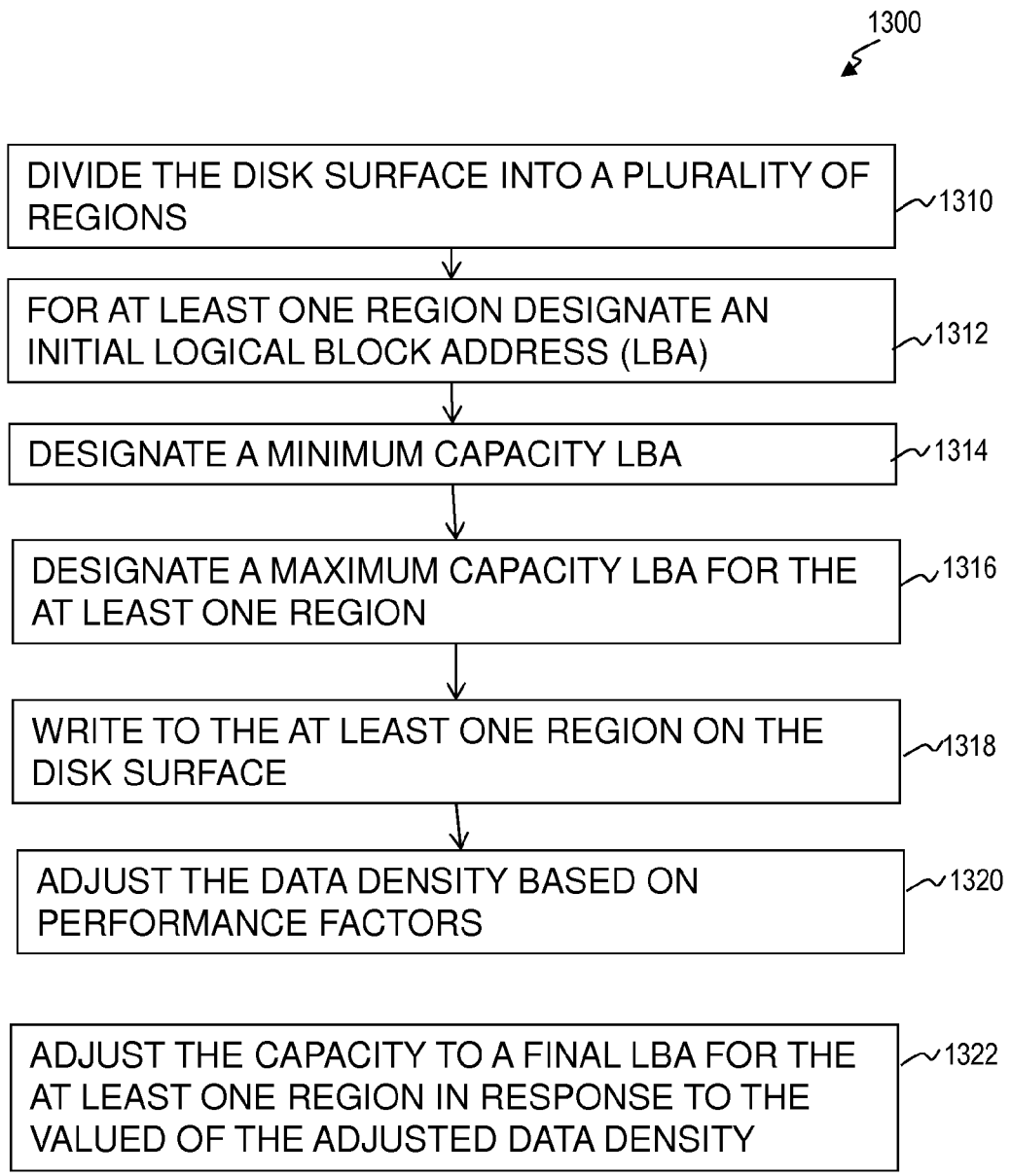
FIG. 13 is a flow diagram of a method for writing information to a magnetizable disk surface on a disk drive, according to an example embodiment.

FIG. 13 is a flow diagram of a method 1300 for writing information to a magnetizable disk surface on a disk drive, according to an example embodiment. The method 1300 includes dividing the disk surface into a plurality of regions 1310, and, for at least one region, designating an initial logical block address (LBA) 1312 and designating a minimum capacity LBA 1314 and a maximum capacity LBA 1316 for the at least one region, writing to the at least one region on the disk 1318 surface and adjusting the data density based on performance factors 1320, and adjusting the capacity to a final LBA for the at least one region in response to the valued of the adjusted data density 1320. The final/end LBA will be less than the maximum capacity LBA. In one embodiment, the plurality of regions are substantially equal in size. In another embodiment, the plurality of regions have at least two sizes. In another embodiment, writing to the at least one region includes overwriting a portion of a previously written track within the at least one region to form a track having a width less than a write width of a write element. In another embodiment, writing to the at least one region includes shingled magnetic recording. In still another embodiment, writing to the at least one region includes perpendicular magnetic recording.

Figure 14:
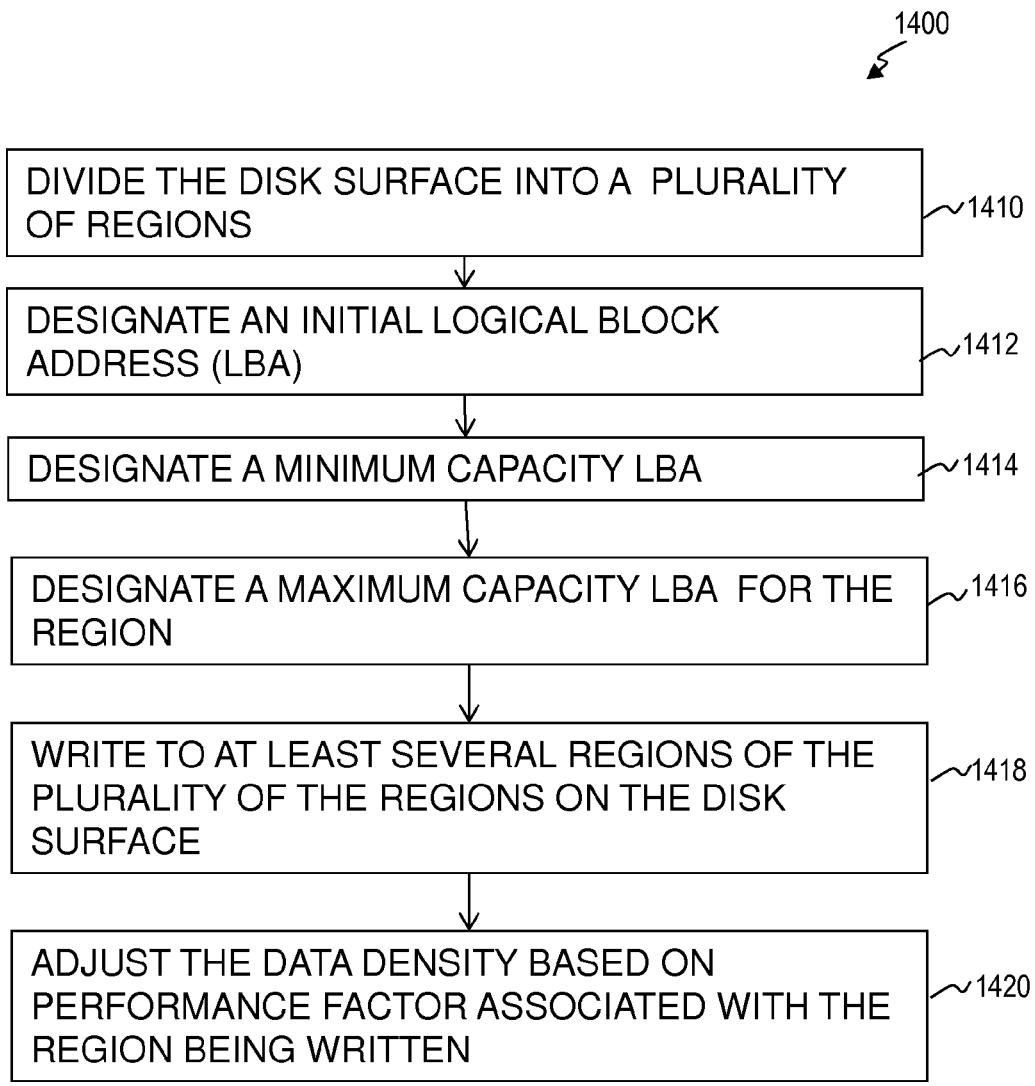
FIG. 14 is a flow diagram of a method for varying the capacity of a disk drive having information to a magnetizable disk surface on a disk drive, according to another example embodiment.

FIG. 14 is a flow diagram of a method 1400 for varying the capacity of a disk drive having information to a magnetizable disk surface on a disk drive, according to another example embodiment. The method 1400 includes dividing the disk surface into a plurality of regions 1410, and for a plurality of regions, designating an initial logical block address (LBA) 1412 and designating a minimum capacity LBA 1414 and a maximum capacity LBA 1416 for the region. The method 1400 also includes writing to at least several regions of the plurality of the regions on the disk surface 1418 and adjusting the data density based on performance factor associated with the region being written 1420. Adjusting the capacity of the region to a final or end LBA for each of the regions being written to in response to the value of the adjusted data density for the region being written to. In one embodiment, the plurality of regions have at least two sizes. In another embodiment, writing to the at least one region of the plurality of regions includes overwriting a portion of a previously written track within the at least one region to form a track having a width less than a write width of a write element. In other embodiments, writing to at least one of the plurality of regions includes perpendicular magnetic recording.

Figure 15:
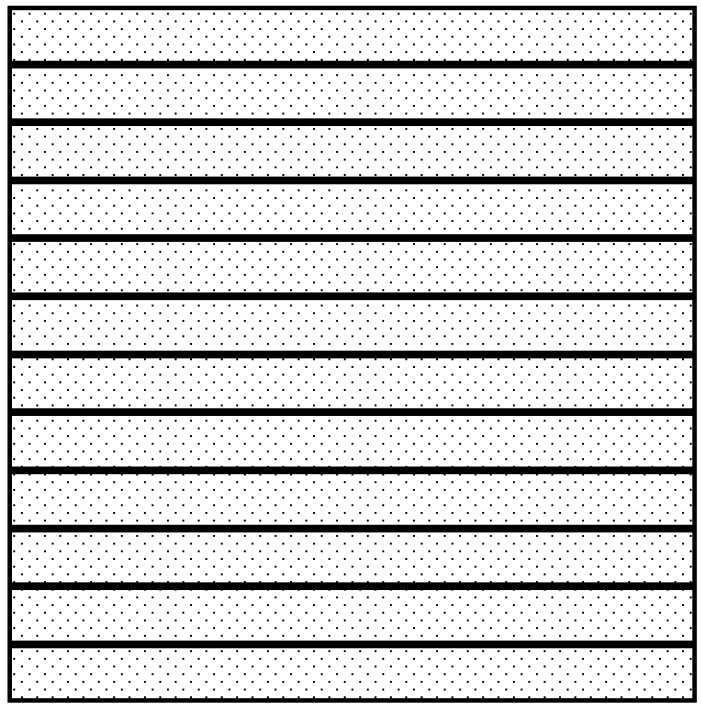
FIG. 15 is a schematic diagram of a physical region of a disk drive and a logical capacity of the physical region at two times T1, T2, according to an example embodiment.
Figure 15:
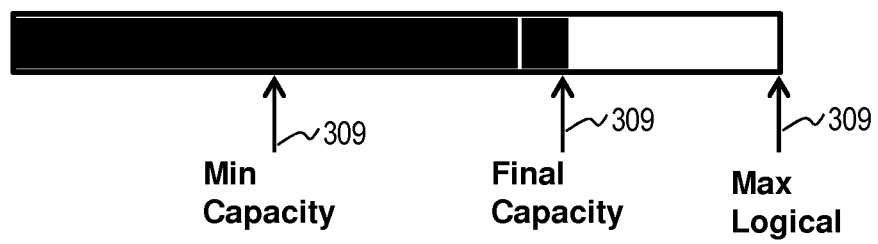

FIG. 15 is a schematic diagram of a physical region 1500 of a disk drive and a logical capacity of the physical region at two times T1, T2, according to an example embodiment. Initially, logical capacity of a physical region is set to an end/final capacity which is between a minimum capacity 1510 and the maximum logical capacity 1520. In this instance, at time T1 the final/and capacity 1512 is located between the minimum capacity 1510 and the maximum logical capacity 1520. The minimum capacity 1510 and the maximum logical capacity 1520 are set at the factory or set at the time of manufacture. The initial setting of the end/final capacity at time T0 is also a factory setting which accounts for a "worst-case scenario". Initially the disk drive 100 places information representing data into the physical region 1500 until the end/final capacity 1512 is met. As mentioned above, the host 150 will where he the disk drive 100 regarding physical region 1500 after it has reached the end/final capacity 1512. As shown, the end/final capacity 1512 stopped short of the end of the physical region as picked up by the three white rectangles shown at the bottom of the physical region 1500. As a result, the physical region 1500 has additional capacity for storing data and returns an indication of additional capacity available to the host 150. Also returned is an estimate of a new end/final capacity 1516. The host 150 or the disk drive 100 and makes this space available for storing information representing data. The host will again write data to the physical region 1500 until the end/final capacity T2 is reached. As shown in FIG. 15, the end/final capacity 1516 is greater than the end/final capacity 1512. Information will be written to this additional available space until the end/final capacity 1516 is filled. Again the host will query the disk drive 100 when the end/final capacity 1516 is reached. If there is additional capacity available in the physical region 1500, the end/final capacity will be adjusted once again. If not, the physical region 1500 will be marked as full and no more right commands will be issued for writing within the region 1500.

In another example embodiment, the host repeats a request for the last logical block address upon determining that the last logical block address is consumed. In other words, it is not necessary for the last physical block to be fully consumed before the host repeats the request for the end capacity of the region. The host can make the request as soon as it determines it will fill the last physical block address associated with a logical block address. If the disk drive has extra capacity in the region, the disk drive will answer the request with a new and increased value for the final/end LBA value. The host can then write information representing data to the additional LBAs represented by the new value of the final/end LBA less the previous value of the final/end LBA. The new value of the final/end LBA will be less than or equal to the max LBA for the region. The new value for the final/end LBA includes, in one embodiment, an estimate of the number of physical block addresses that the remaining portion of the region can hold.

In still another example embodiment, a disk drive having at least one disk with at least two major disk surfaces includes a first I-region having a first maximum logical block address, a second I-region having a second maximum logical block address, and an E-region. Information can be written temporarily to the E-region. This can be done when moving information representing data from one region to another. It can also be done when the information is received from the host. In some embodiments, the information written directly to the first I-region from the host and information written directly to the second I-region from the host. In many cases, the information is written to the first I-region using a first writing method, and is written to the second I-region using a second method.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments. These and other example embodiments are within the scope of the following claims.

What is claimed:

1. A disk drive having at least one disk with a major disk surface comprising:
   a first region including tracks having a first track width and a second track width, the second track width being wider than the first track width; and
   a second region including tracks having a third track width and a fourth track width, the third track width being wider than the fourth track width; and
   a guard band positioned between the first region and the second region, the second track and the third track being positioned adjacent the guard band.

2. The disk drive of claim 1 wherein the first region includes a plurality of tracks between the first track and the second track, and wherein the second region includes a plurality of tracks between the third track and the fourth track.

3. The disk drive of claim 1 wherein the first region includes a plurality of tracks between the first track and the second track, the tracks positioned near the second track having track widths that are wider than the tracks positioned near the first track, and wherein the second region includes a plurality of tracks between the third track and the fourth track, the tracks positioned near the third track having track widths that are wider than the tracks positioned near the fourth track.

4. The disk drive of claim 1 wherein the first region includes a plurality of tracks between the first track and the second track, the tracks positioned near the second track having track widths that are wider than the tracks positioned near the first track, the tracks between the first track and the second track having increasing track widths from the first track to the second track.

5. The disk drive of claim 4 wherein the track widths of a plurality of tracks positioned between the first track and the second track are constantly expanded.

6. The disk drive of claim 1 further comprising:
   a write element for writing information representing data; and
   a read element for reading information from a track on the disk; and
   a controller for controlling at least the position of the write element as information representing data is written to the track.

7. The disk drive of claim 6 wherein the write element is positioned by the controller to overwrite at least a portion of a previously written track in at least one of the first region and the second region.

8. The disk drive of claim 6 wherein the write element is dynamically controlled to overwrite at least a portion of a previously written track in at least one of the first region and the second region.

9. A disk drive having at least one disk with a major disk surface comprising:

a first region including tracks having a first track width and a second track width, the second track width being wider than the first track width; and a second region including tracks having a third track width and a fourth track width and a fifth track width, the track having the third track width and the track having the fourth track width being wider than the track having the fifth track width;

a third region including tracks having a sixth track width and a seventh track width, the track having the sixth track width being wider than the track having the seventh track width;

a first guard band positioned between the first region and the second region, the track having the second track width and the track having the third track width positioned adjacent the first guard band; and a second guard band positioned between the second region and the third region, a track having the fourth track width and a track having the sixth track width positioned adjacent the second guard band.

10. The disk drive of claim 9 wherein the track having the fifth track width is positioned between the track having the third track width and the track having the fourth track width.

11. The disk drive of claim 9 further comprising:

a write element for writing information representing data; and a read element for reading information from a track on the disk; and a controller for controlling at least the position of the write element as information representing data is written to the track.

12. The disk drive of claim 11 wherein the write element is positioned by the controller to overwrite at least a portion of a previously written track in the second region.

13. The disk drive of claim 12 wherein the write element is dynamically controlled to overwrite at least a portion of a previously written track in the second region.

14. A method for decreasing far track interference on a disk drive comprising:

designating a plurality of regions on a disk where information is to be stored;

separating at least two of the plurality of regions on the disk drive by a guard bands; and writing information representing data to at least one of the plurality of regions, the information written to one or more tracks within the region of the disk, the track adjacent at least one of the guard bands of the region having a width greater than a track an area in the middle of the region.

15. The method of claim 14 wherein writing information to the disk in the at least one region includes overwriting at least a portion of a previously written track.

16. The method of claim 14 wherein writing information to the disk in the at least one region includes overwriting at least a portion of a previously written track, the amount of overwriting being dynamically variable.

17. The method of claim 14 further comprising an indication from an environmental stability indicator wherein writing information to the disk in the at least one region includes overwriting at least a portion of a previously written track, the amount of overwriting in response to an output from the environmental stability indicator.

18. The method of claim 14 further comprising an indication from an environmental stability indicator wherein writing information to the disk in the at least one region includes overwriting at least a portion of a previously written track, the amount of overwriting being dynamically variable and in response to an output from the environmental stability indicator.

19. The method of claim 14 wherein writing information to the disk in the at least one region includes:

overwriting at least a portion of a previously written track; and reading information representing data as written to on the previously overwritten track to verify the write operation.

20. The method of claim 19 further comprising making the portion of an E-region on the disk available for writing in response to verifying the write operation.

* * * * *